United States Patent
Bui

(10) Patent No.: US 7,068,611 B2
(45) Date of Patent: Jun. 27, 2006

(54) METHOD AND APPARATUS FOR PERFORMING DIAGNOSTIC TESTS USING AN ASSISTING TRANSCEIVER

(75) Inventor: Sang T. Bui, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 893 days.

(21) Appl. No.: 10/086,725

(22) Filed: Mar. 4, 2002

(65) Prior Publication Data

US 2002/0123350 A1    Sep. 5, 2002

Related U.S. Application Data

(60) Provisional application No. 60/272,742, filed on Mar. 2, 2001.

(51) Int. Cl.
*H04J 1/16*    (2006.01)
(52) U.S. Cl. ............. 370/252; 370/286; 375/224; 379/3; 379/406.05
(58) Field of Classification Search ........... 370/248, 370/252, 286, 292; 375/224, 148; 379/22.02, 379/406.05, 406.01, 3
See application file for complete search history.

(56) References Cited

U.S. PATENT DOCUMENTS 5,751,152 A    5/1998    DuBose et al. ............. 324/628
5,784,406 A *  7/1998    DeJaco et al. ............. 375/224

FOREIGN PATENT DOCUMENTS

EP    0985933    3/2000

* cited by examiner

*Primary Examiner*—John Pezzlo
(74) *Attorney, Agent, or Firm*—Squire, Sanders & Dempsey, L.L.P.

(57) ABSTRACT

A method and system for performing diagnostic tests on a communications system. Diagnostic test signals are generated by a transceiver included within the communications system. Diagnostic data signals generated within the communications system in response to the diagnostic test signals are collected by the transceiver. The communications transceiver may operate alone, with an assisting communications transceiver, or with a non-assisting communications transceiver. The collected diagnostic data signals are stored and made available for later analysis. The method and system are used to generate and store ECHO Crosstalk, Near End Cross Talk (NEXT) and Far End CrossTalk (FEXT) data signals.

47 Claims, 20 Drawing Sheets

MDIX: Link pulse - no fext

1) No mdix tx link pulse tx link pulse 2) mdix

METHOD AND APPARATUS FOR PERFORMING DIAGNOSTIC TESTS USING AN ASSISTING TRANSCEIVER

REFERENCE TO RELATED APPLICATIONS

This application claims priority of U.S. Provisional Patent Application Ser. No. 60/272,742 filed on Mar. 2, 2001. The contents of this provisional application are hereby incorporated by reference.

BACKGROUND OF THE INVENTION

1. Field of the Invention

The invention relates generally to the field of communications systems and specifically to diagnosing error conditions in high-speed communication systems.

2. Description of the Related Art

In many communications systems there is a need to troubleshoot the network's to make sure that the network cabling has been installed according to specification and is operating properly. Thus, network testing and diagnostics are extremely useful to monitor the network and warn the network manager of impending problems. Furthermore, network testing and diagnostic testing systems may be designed to gather useful information about the conditions of a network and provide statistical information about the equipment connected to the network. For instance, the diagnostic testing system may be programmed to identify the conditions of coupled external systems. In a high-speed communication system, for example, characteristics of the communications channel such as the length of the link, noise, and signal attenuation and distortion through the channel may be important factors affecting the quality of the system. Noise testing is important because such testing aids in the detection of crosstalk. Crosstalk is noise emanating from the signals transmitted on adjacent wire pairs. Namely, the crosstalk is the generation of undesired signals from another circuit in the same system.

There may be cases where channel impairments are so drastic that it is not even possible to establish a communication link between or within systems. Having the ability to quickly identify the conditions resulting from a failure and the possible causes of the channel impairments may permit the user of the communication system to take remedial action thus minimizing the costs attributed to the failure. Identifying and solving the problems that has led to the failure would be greatly facilitated if the communication system itself was designed with enough intelligence to self-diagnose the cause of the failure and report the cause to the user. However, most conventional diagnostic devices are tools that technicians carry around with them to troubleshoot the network's problems.

A Gigabit Ethernet in copper-based Local Area Networks (LANs) is an exemplary communications system that may benefit from such a self-diagnosing diagnostic measurement device. Other popular communication systems, which may benefit from such diagnostic testing devices, are known as the 100Base-TX Fast Ethernet standard and 10Base-T standard which are adaptations of the IEEE (Institute of Electrical and Electronic Engineers) 802.3 standard. The 10Base-T standard relates to twisted-pair cables having a maximum segment lengths of 100 meters. The 100Base-TX standard, which is based on the transmission over Category-5 Unshielded Twisted Pairs (UTP-5), has found widespread application in recent years. However, the need for higher data rates has prompted the development of an even higher speed transmission standard, the IEEE 802.3ab, also known as 1000Base-T. Communication systems based on the 1000Base-T standard transmit at 1 Gb/s, also using Category-5 UTP.

However, there are important differences in the manner in which the Category-5 cable is used in 100Base-TX versus the 1000Base-T. For example, 100Base-TX is essentially a half-duplex transmission scheme, where full-duplex operation is achieved by using one pair of the UTP-5 cable to transmit signals and another pair to receive signals. The UTP-5 cable has four-twisted pairs, therefore two of the pair of twisted wires typically remain unused in 100Base-TX. On the other hand, 1000Base-T provides full-duplex transmission over the four pairs of the UTP-5 cable. This means that each pair of wire is used both to transmit and receive the signals. The transmitted and received signals, which coexist in the cable, are separated at the receiver using echo cancellation techniques. To achieve an aggregate data rate of 1 Gb/s, the four pairs of the UTP-5 cable are used, each one supporting a data rate of 250 Mb/s. Since 1000Base-T uses the same cabling as 100Base-TX, the transition to the higher speed standard 1000Base-T can be made using the same cabling system without the need to rewire a building or install new cable. However, since 100Base-TX does not use two of the four pairs of the UTP-5 cable, it is possible that in many installations the two unused pairs may be improperly connected. Since these two pairs may have been unused, any faulty connections may have gone undetected. These faulty connections would have to be identified and fixed in order for the 1000Base-T system to work using the 100Base-TX cabling system. Such diagnosis could add to the cost of installing 1000Base-T to a system, even if no rewiring is needed in principle.

SUMMARY OF THE INVENTION

A method and system for performing diagnostic tests on a communications system is provided. Diagnostic test signals are generated by a transceiver included within the communications system. Diagnostic data signals generated within the communications system are collected by the transceiver. The communications transceiver may operate alone, with an assisting communications transceiver, or with a non-assisting communications transceiver. The collected diagnostic data signals are stored and made available for later analysis. The method and system are used to generate and store ECHO Crosstalk, Near End Cross Talk (NEXT) and Far End Cross Talk (FEXT) data signals.

In one aspect of the invention, a first and second transceiver are operatively coupled via a communications link including a plurality of channels. The second transceiver assists the first transceiver in generating diagnostic data signals. The first transceiver transmits to the second transceiver a first pulse signal via a first channel included in the communications link. The second transceiver transmits to the first transceiver a second pulse signal via a second channel included in the communications link. The second transceiver generates the second pulse signal in response to the first pulse signal. The first transceiver transmits a test signal into the communications link. The first transceiver receives via the communications link a data signal generated within the communications link in response to the test signal.

In another aspect of the invention, the first and second pulse signals are periodic. The first and second pulse signals are continuously transmitted while the first transceiver transmits the test signal and receives the data signal.

In another aspect of the invention, the first transceiver stores the data signal for later processing.

In another aspect of the invention, the first transceiver transmits to the second transceiver a first pulse signal via a first channel included in the communications link. The first transceiver also transmits to the second transceiver a command signal via a second channel included in the communications link. The second transceiver receives from the first transceiver the command signal. The second transceiver transmits into the communications link a test signal with the test signal being generated by the second transceiver using the command signal. The first transceiver then receives from the communications link a data signal generated within the communications link in response to the test signal.

In another aspect of the invention, the first transceiver selects a selected channel from the plurality of channels. The first transceiver includes a selected channel identification in the command signal. The second transceiver determines the selected channel identification from the command signal. The second transceiver then transmits by the second transceiver the test signal into the communications link using the selected channel.

In another aspect of the invention, the first transceiver selects a selected channel from the plurality of channels by determining a converged channel for which a first decision feedback equalizer included in the first transceiver and a second decision feedback equalizer included in the second transceiver have converged. The converged channel is then used as the selected channel.

In another aspect of the invention, the pulse signal is periodic and is continuously transmitting by the first transceiver pulse signal while the second transceiver transmits the test signal and the first transceiver receives the data signal.

BRIEF DESCRIPTION OF THE DRAWINGS

The objects and features of the invention will be more readily understood with reference to the following description and the attached drawings, wherein.

DETAILED DESCRIPTION

The invention provides a self-diagnosing system that is capable of detecting faulty wire connections, as well as crosstalk. The invention performs data collection sessions to collect, store and analyze the data regarding the cabling system of a network. The invention may also be configured to detect a variety of crosstalk situations, such as near-end crosstalk (NEXT), far-end crosstalk (FEXT) and ECHO crosstalk, which may distort a signal being transmitted along a channel within the system.

Figure 18:
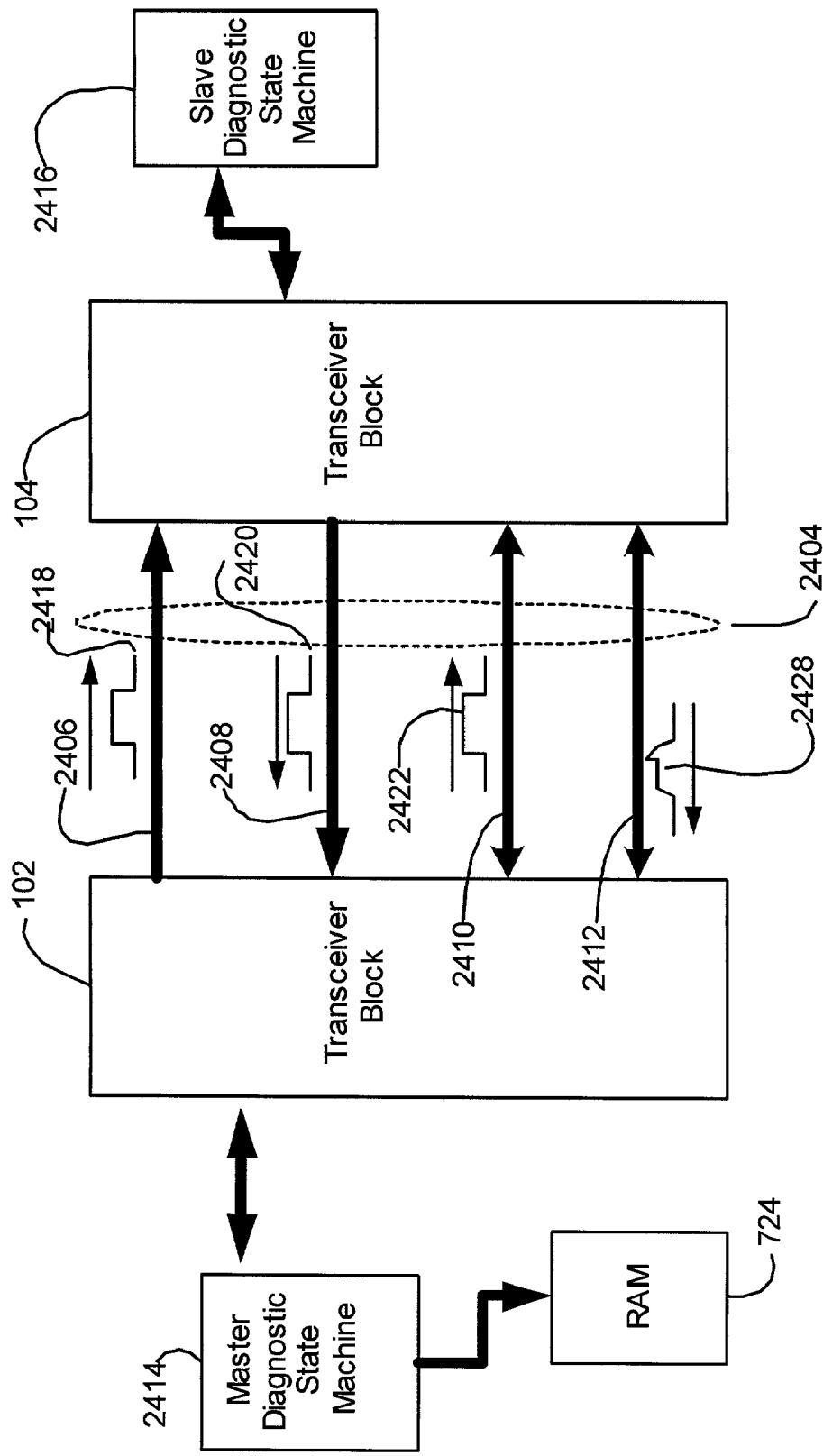
FIG. 18 is a block diagram of two exemplary diagnostic state machines cooperating in a diagnostic data collection session to collect NEXT data signals in accordance with the present invention.

FIG. 18 is a block diagram of two exemplary diagnostic state machines cooperating in a NEXT data collection session in accordance with an embodiment of the invention. NEXT is crosstalk that travels in the reverse direction as the signal in the disturbed channel. In FIG. 18, a first transceiver block 102 is operably coupled to a second transceiver block 104 creating a communications link 2404. According to this embodiment, the communications link may include four separate channels 2406, 2408, 2410, and 2412. The transceiver blocks 102, 104 transmit and receive data signals using the channels included in the communication links.

A master diagnostic state machine 2414 is operably coupled to and controls the operations of the first transceiver block 102. The master diagnostic state machine 2414 may operate within the system to control or initiate the actions or responses of the other elements of the system. A slave diagnostic state machine 2416 is operably coupled to and controls the operations of the second transceiver block 104. The master and slave diagnostic state machines may employ one or more of the channels in the communications link to transmit and receive diagnostic pulse signals 2418 and 2420. To confirm that a diagnostic data collection session is still active, the master and slave diagnostic state machines may use the diagnostic pulse signals. If either the master or slave diagnostic state machine detects that the diagnostic pulse signals are no longer being transmitted, then the diagnostic data collection session may be terminated.

The master diagnostic state machine 2414 transmits the diagnostic test signals 2422 into the communications link using a single channel of the communications link. In response to the diagnostic test signals, components of the communications link generate NEXT data signals 2428 on the channels within the communications link other than the diagnostic test signal channel. The diagnostic test signals may be transmitted far apart in time from the diagnostic pulse signals to maintain the diagnostic test signals. The master diagnostic state machine receives the NEXT data signals 2428 and digitizes the signals for storage in a Random Access Memory (RAM) 724 for later processing.

It is to be further noted that the invention is not limited to the embodiment shown. For instance, the invention can collect data along any pair of wires within the system. Furthermore, the invention can send and receive diagnostic pulse signals along any channel within the system.

In accordance with another embodiment of a diagnostic state machine of the invention, the NEXT and ECHO signal data can be collected without the assistance of a cooperating diagnostic state machine. In this embodiment, diagnostic test signals are transmitted via any channel included in the communications link and no diagnostic pulse signals are transmitted during the diagnostic data collection session.

Figure 19:
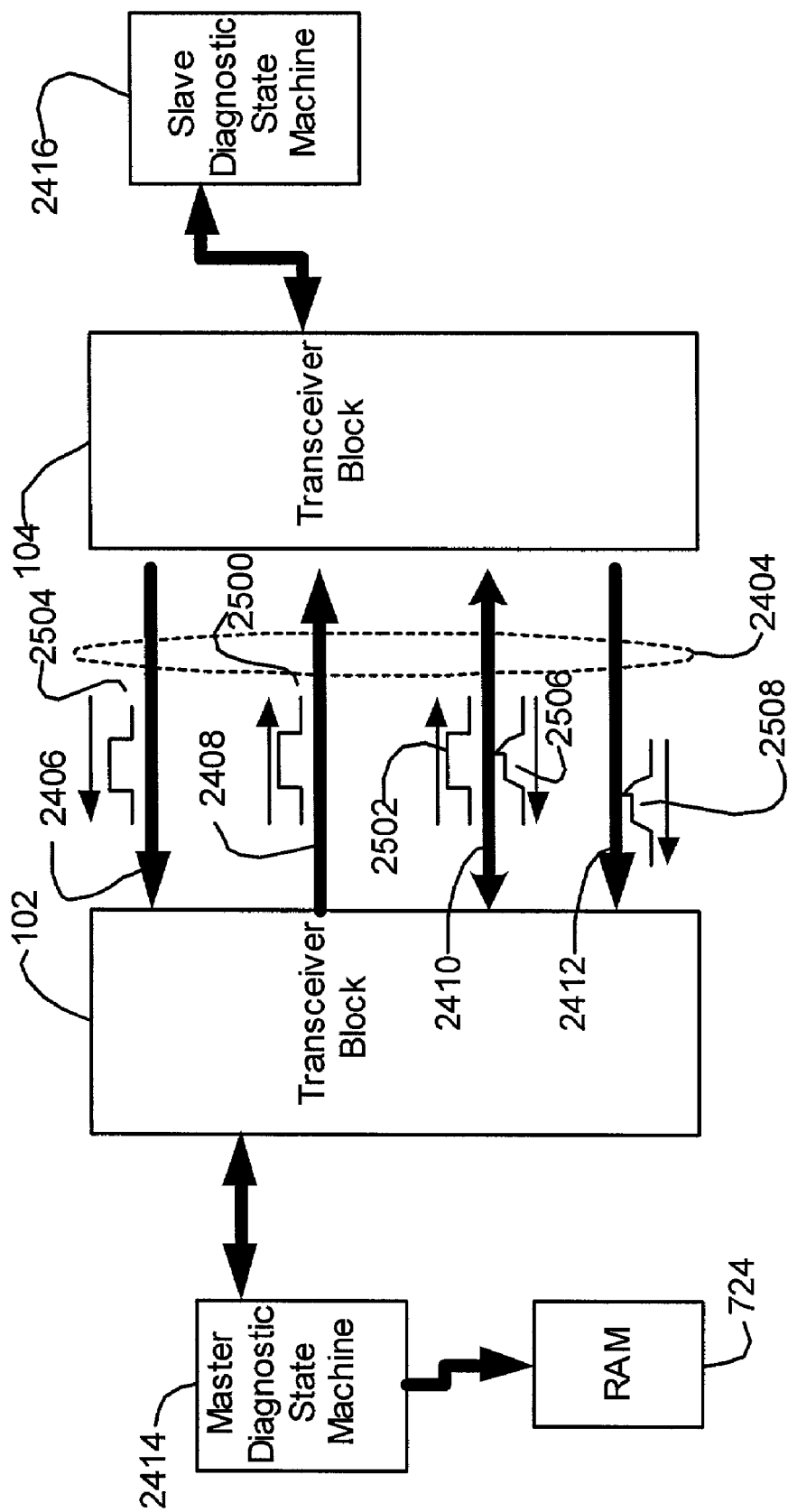
FIG. 19 is a block diagram of two exemplary diagnostic state machines cooperating in a FEXT data collection session to collect far end cross talk data in accordance with the present invention.

FIG. 19 is a block diagram of two exemplary diagnostic state machines cooperating in a diagnostic data collection session to collect far end cross talk (FEXT) data signals in accordance with the invention. FEXT crosstalk is crosstalk that travels along the disturbed channel in the same direction as the desired signals. A first transceiver block 102 is operably coupled to a second transceiver block 104 creating a communication link 2404. The communications link includes four separate channels 2406, 2408, 2410, and 2412. The transceiver blocks transmit and receive data signals using the channels included in the communications link.

A master diagnostic state machine 2414 is operably coupled to and controls the operations of the first transceiver block 102. A slave diagnostic state machine 2416 is operably coupled to and controls the operations of the second transceiver block 104. The master diagnostic state machine 2414 uses one of the channels in the communication links to transmit diagnostic pulse signals 2500 to the slave diagnostic state machine 2416. These diagnostic pulse signals 2500 are used by the slave diagnostic state machine 2416 to confirm that a diagnostic data collection session is still active. If the slave diagnostic state machine 2416 detects that the diagnostic pulse signals 2500 are no longer being transmitted, then the diagnostic data collection session is terminated. The master diagnostic state machine 2414 may use idle signals (not shown) transmitted by the slave diagnostic state machine 2416 to confirm that the slave diagnostic state machine 2416 is still cooperating in the diagnostic data collection session.

The master diagnostic state machine 2414 transmits diagnostic command signals 2502 to the slave diagnostic state machine 2416 via a channel included in the communications link which is not being used to transmit of the diagnostic pulse signals. The slave diagnostic state machine 2416 receives the diagnostic command signals. The slave diagnostic state machine 2416 may use the diagnostic command 2502 signals to generate and transmit a diagnostic test signal 2504 which is transmitted on one of the channels included in the communications link 2402. Transmission of the diagnostic test signal 2504 results in FEXT diagnostic test data signals 2506 and 2508 being generated in other communication channels which are included in the communications link. The master diagnostic state machine receives the diagnostic data signals 2506, 2508 and digitizes the diagnostic data signals for storage in RAM 724. The stored diagnostic data signals 2506, 2508 are later analyzed.

It is to be further noted that the invention is not limited to the embodiment shown. For instance, the invention can collect data along any pair of wires within the system. Furthermore, the invention can send and receive diagnostic pulse signals along any channel within the system.

Figure 20:
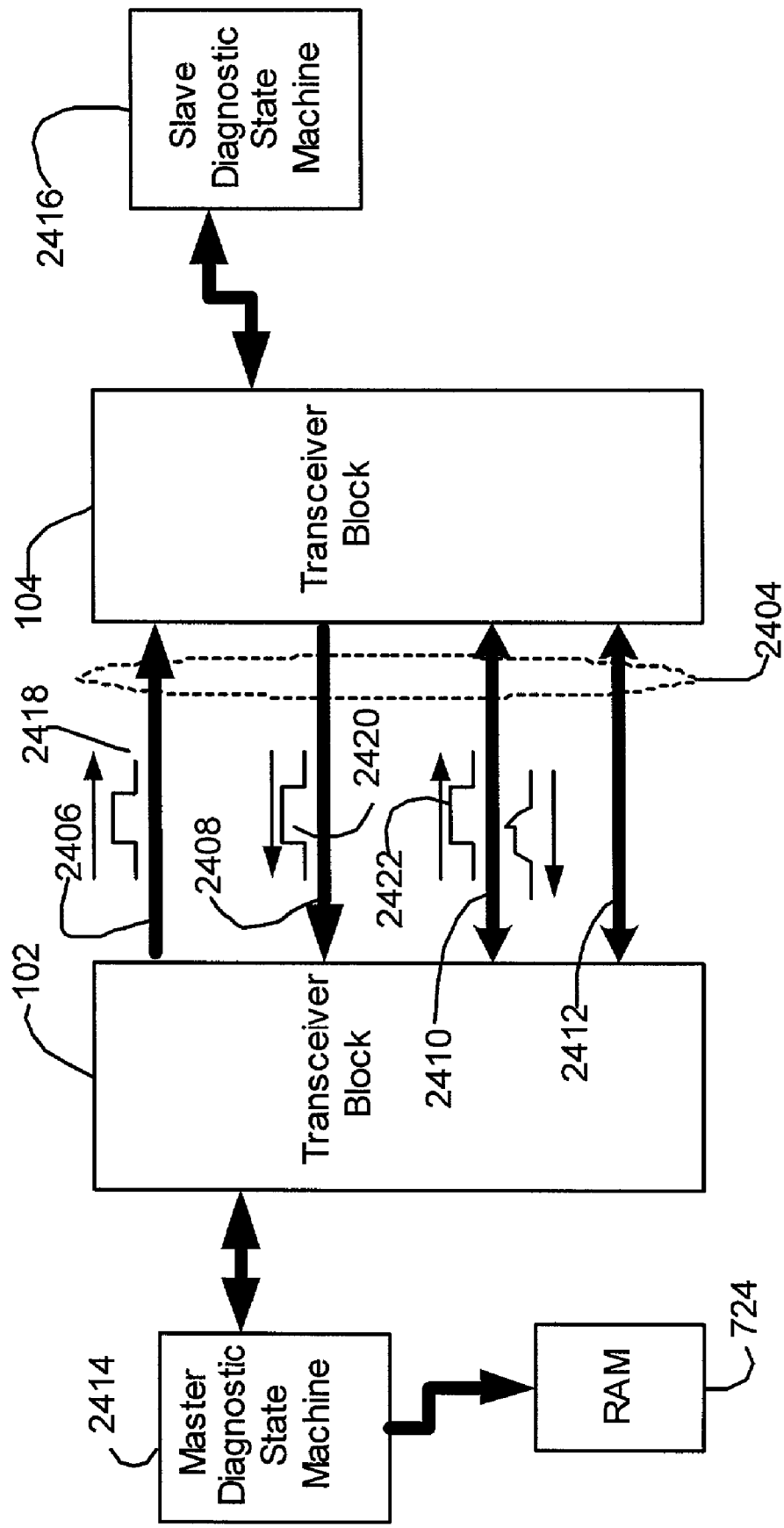
FIG. 20 is a block diagram of two exemplary diagnostic state machines cooperating in an ECHO data collection session in accordance with the present invention.

FIG. 20 is a block diagram of two exemplary diagnostic state machines cooperating in ECHO data collection session in accordance with this embodiment of the invention. ECHO crosstalk is crosstalk that travels bi-directionally along the same channel. In FIG. 20, a first transceiver block 102 is operably coupled to a second transceiver block 104 creating a communications link 2404. The communications link includes four separate channels 2406, 2408, 2410, and 2412. The transceiver blocks 102, 104 transmit and receive data signals using the channels included in the communications link.

A master diagnostic state machine 2414 is operably coupled to and controls the operations of the first transceiver block. A slave diagnostic state machine 2416 is operably coupled to and controls the operations of the second transceiver block. The master and slave diagnostic state machines use one or more of the channels in the communications link 2404 to transmit and receive diagnostic pulse signals 2418 and 2420. These diagnostic pulse signals 2418, 2420 are used by the master and slave diagnostic state machines 2416 to confirm that a diagnostic data collection session is still active. If either the master or slave diagnostic state machine 2416 detects that the diagnostic pulse signals 2418, 2420 are no longer being transmitted, then the diagnostic data collection session is terminated.

The master diagnostic state machine 2414 transmits diagnostic test signals 2422 into the communications link 2404 using a single channel of the communications link. In response to the diagnostic test signals 2422, components of the communications link 2404 generate ECHO data signals 2424 on the same channel as the diagnostic test signal 2422 within the communications link 2404. The diagnostic signals are transmitted via channels in the communication link 2404 that are not being used to maintain the diagnostic pulse signals 2418, 2420. The master diagnostic state machine 2414 receives the ECHO data signals 2424 and digitizes the signals for storage in a Random Access Memory (RAM) 724 for later processing.

It is to be further noted that the invention is not limited to the embodiment shown. For instance, the invention can collect data along any pair of wires within the system. Furthermore, the invention can send and receive diagnostic pulse signals along any channel within the system.

In another embodiment of a diagnostic state machine in accordance with the invention, ECHO signal data may be collected without the assistance of a cooperating diagnostic state machine. In this embodiment, diagnostic test signals 2504 are transmitted via any channel included in the communications link 2404 and no diagnostic pulse signals 2418, 2420 are transmitted during the diagnostic data collection session.

The embodiments described herein FIGS. 18–20 are merely exemplars, and the invention is not limited to such exemplars. The scope of the invention encompasses other embodiments that would be obvious to one of ordinary skill in the art. For instance, in another embodiment, the communication link may include a different number of communication links.

In another embodiment of the diagnostic state machines in accordance with the invention, the diagnostic state machines may be used to diagnose a 1000Base-T implementation including two transceivers communicating over four twisted wire pairs as described below.

Figure 1:
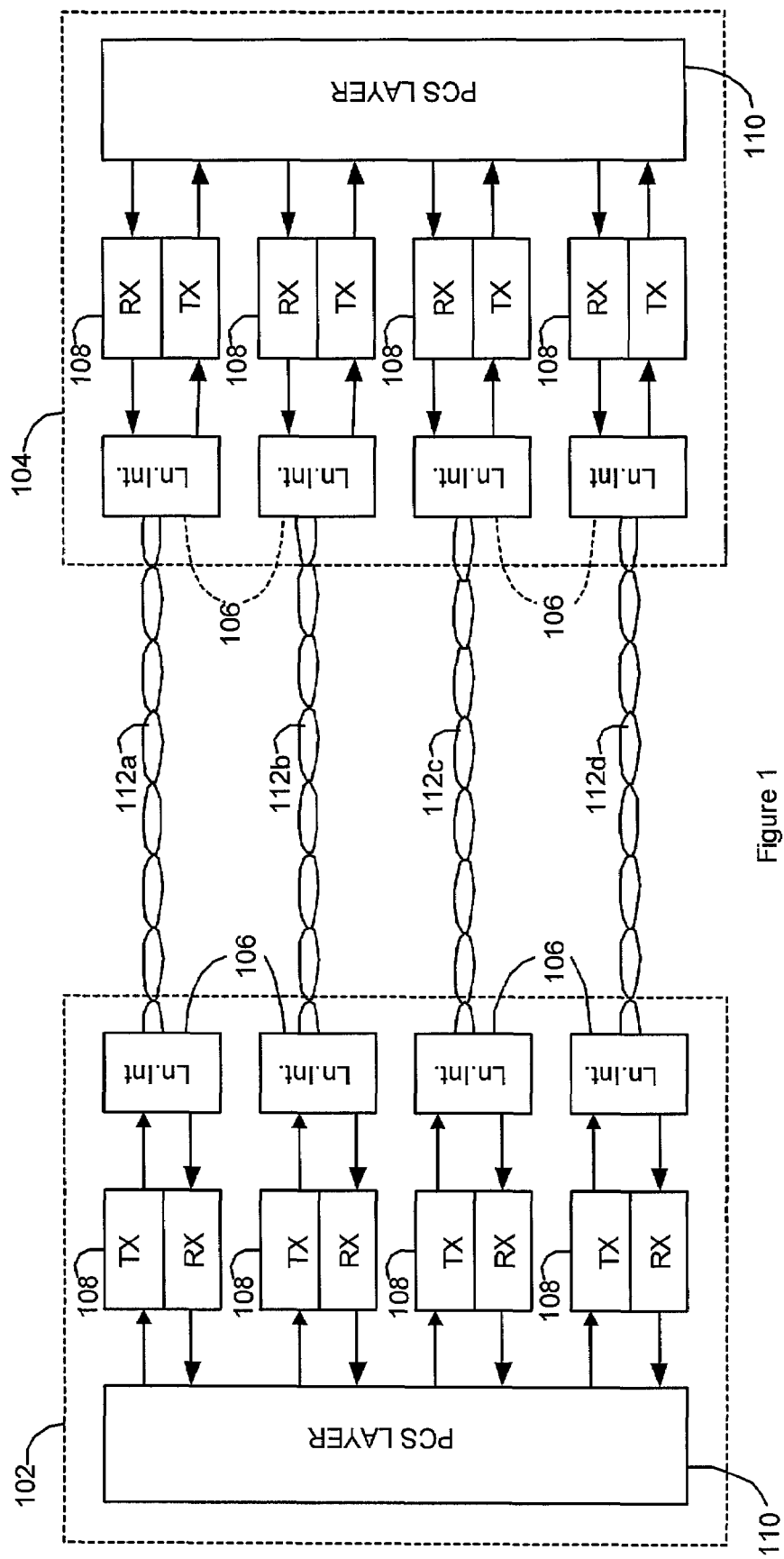
FIG. 1 is a schematic of a system having four transceivers communicating over four twisted wire pairs according to one embodiment of the invention.

FIG. 1 is a schematic of an exemplary embodiment of four transceivers combined in a 1000Base-T implementation communicating over four twisted wire pairs. The communication system is represented as a point-to-point system in order to simplify the explanation, and includes two main transceiver blocks 102 and 104, coupled together via four twisted-pair cables 112a, 112b, 112c and 112d. The four twisted pairs 112a–d correspond to the communications link previously described in FIGS. 18–20. Each of the twisted pairs correspond to one of the previously described channels included in the previously described communications link. For the convenience of the following discussion, main transceiver 102 may also be termed a local transceiver and main transceiver 104 may be termed a remote transceiver. Each of the wire pairs 112a–d is coupled to each of the transceiver blocks 102, 104 through a respective one of the four line interface circuits 106. Each of the wire pairs 112a–d facilitates communication of information between corresponding pairs of the four pairs of transmitter/receiver circuits (constituent transceivers) 108. Each of the constituent transceivers 108 is coupled between a respective line interface circuit 106 and a Physical Coding Sublayer (PCS) block 110. At each of the transceiver blocks 102 and 104, the four constituent transceivers 108 are capable of operating simultaneously, for example, at 250 megabits of information data per second (Mb/s) each, i.e., 125 Mbaud at two information data bits per symbol, the two information data bits being encoded in one of the five levels of the PAM-5 (Pulse Amplitude Modulation) alphabet. The four constituent transceivers 108 are coupled to the corresponding remote constituent transceivers through respective line interface circuits to facilitate full-duplex bi-directional operation. Thus, 1 Gb/s communication throughput of each of the transceiver blocks 102 and 104 is achieved by using four 250 Mb/s constituent transceivers 108 for each of the transceiver blocks 102, 104 and four pairs of twisted copper cables to connect the two transceiver blocks 102, 104 together.

Figure 2:
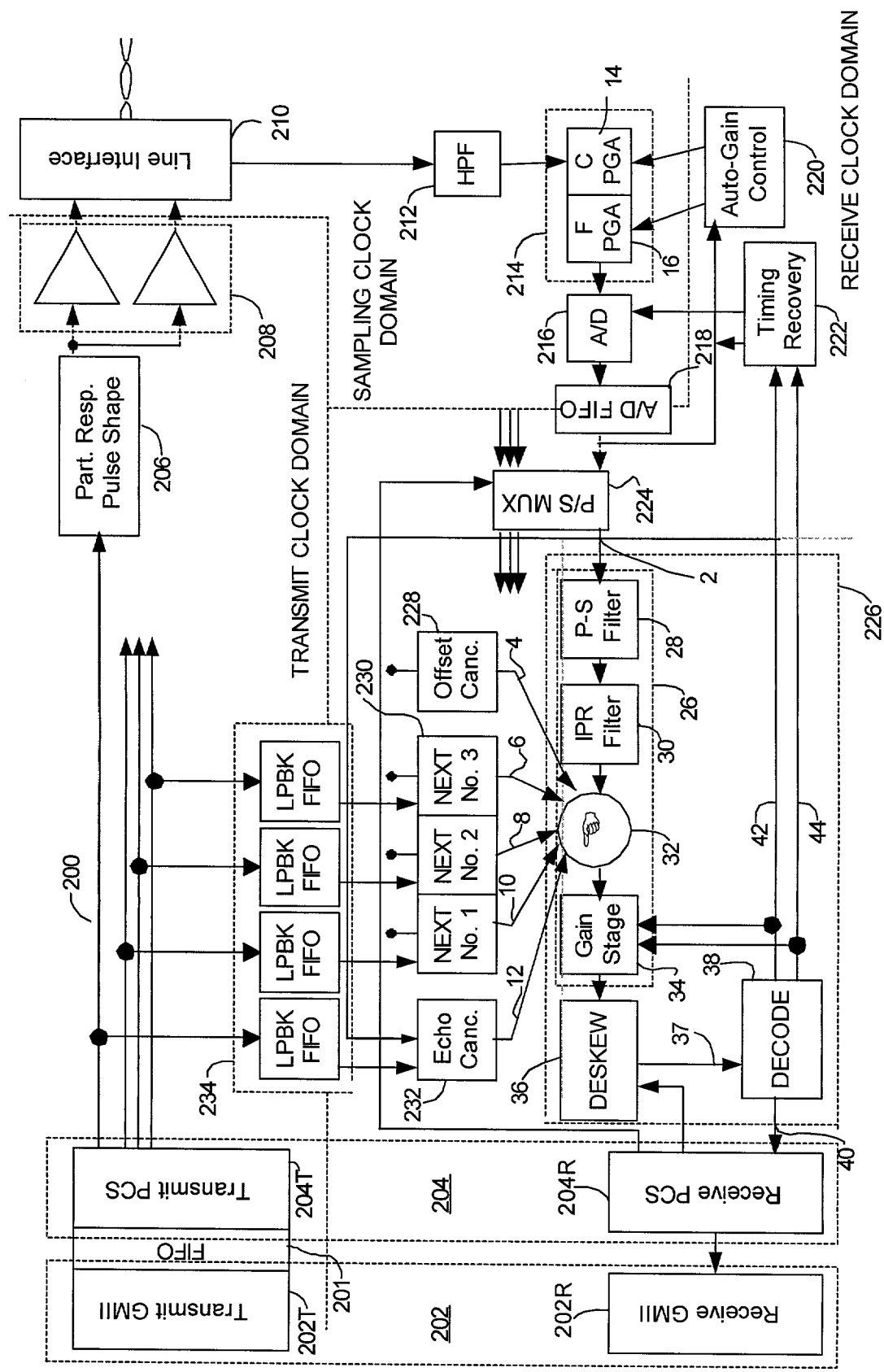
FIG. 2 is a schematic of an exemplary embodiment of a single transceiver as shown in FIG. 1.

FIG. 2 is a simplified block diagram of the functional architecture and internal construction of an exemplary transceiver block, indicated generally at 200, such as transceiver 102 of FIG. 1. Since the illustrative transceiver application relates to Gigabit Ethernet transmission, the transceiver will be referred to as the "Gigabit transceiver 200." For ease of illustration and description, FIG. 2 shows only one of the four 250 Mb/s constituent transceivers 108 which may operate simultaneously (termed herein four-dimensional operation). However, since the operation of the four constituent transceivers 108 are necessarily interrelated, certain blocks and signal lines in the exemplary embodiment of FIG. 2 perform four-dimensional operations and carry four-dimensional signals, respectively. The use of the term "four-dimensional" means that the data from the four constituent transceivers are used simultaneously. In order to clarify the signal relationships in FIG. 2, thin lines correspond to one-dimensional functions or signals (i.e., relating to only a single constituent transceiver), and thick lines correspond to four-dimensional functions or signals (relating to all four constituent transceivers) are illustrated.

Referring to FIG. 2, the Gigabit transceiver 200 includes a Gigabit Medium Independent Interface (GMII) block 202 subdivided into a receive GMII circuit 202R and a transmit GMII circuit 202T. The transceiver also includes a Physical Coding Sublayer (PCS) block 204, subdivided into a receive PCS circuit 204R and a transmit PCS circuit 204T, a pulse shaping filter 206, a digital-to analog (D/A) converter block 208, and a line interface block 210, all generally encompassing the transmitter portion of the transceiver.

The receiver portion of the transceiver generally includes a highpass filter 212, a Programmable Gain Amplifier (PGA) 214, an analog-to-digital (A/D) converter 216, an Automatic Gain Control (AGC) block 220, a timing recovery block 222, a pair-swap multiplexer block 224, a demodulator 226, an offset canceller 228, a Near-End Crosstalk (NEXT) canceller block 230 having three constituent NEXT cancellers and an echo canceller 232.

The Gigabit transceiver 200 also includes an A/D first-in-first-out buffer (FIFO) 218 to facilitate proper transfer of data from the analog clock region to the receive clock region, and a loopback FIFO block (LPBK) 234 to facilitate proper transfer of data from the transmit clock region to the receive clock region. The Gigabit transceiver 200 can optionally include an additional adaptive filter to cancel Far-End Crosstalk noise (FEXT canceller).

In operational terms, on the transmit path, the transmit section 202T of the GMII block receives data from a Media Access Control (MAC) module (not shown in FIG. 2) in byte-wide format, for example, at the rate of 125 MHz and passes the data to the transmit section 204T of the PCS block via the FIFO 201. The FIFO 201 ensures proper data transfer from the MAC layer to the Physical Coding (PHY) layer, since the transmit clock of the PHY layer is not necessarily synchronized with the clock of the MAC layer. In one embodiment, a small FIFO 201, including from about three to about five memory cells to accommodate the elasticity requirement which is a function of frame size and frequency offset may be provided.

The PCS transmit section 204T performs certain scrambling operations and, in particular, is responsible for encoding digital data into the requisite codeword representations appropriate for transmission. In the illustrated embodiment of FIG. 2, the transmit PCS section 204T incorporates a coding engine and a signal mapper that implements a trellis coding architecture, such as required by the IEEE 802.3ab specification for gigabit transmission.

In accordance with this encoding architecture, the PCS transmit section 204T generates four one-dimensional symbols, one for each of the four constituent transceivers. The one-dimensional symbol generated for the constituent transceiver depicted in FIG. 2 is filtered by the pulse shaping filter 206. This filtering process assists in reducing the radiated emission of the output of the transceiver such that the radiated emission falls within the parameters required by the Federal Communications Commission. The pulse shaping filter 206 is implemented so as to define a transfer function of $0.75+0.25z^{-1}$. This particular implementation is chosen so that the power spectrum of the output of the transceiver falls below the power spectrum of a 100Base-Tx signal. The 100Base-Tx is a widely used and accepted Fast Ethernet standard for 100 Mb/s operation on two pairs of Category-5 twisted pair cables. The output of the pulse shaping filter 206 is converted to an analog signal by the D/A converter 208 operating, for example, at 125 MHz. The analog signal passes through the line interface block 210, and is placed on the corresponding twisted pair cable.

On the receive path, the line interface block 210 receives an analog signal from the twisted pair cable. The received analog signal is preconditioned by the highpass filter 212 and the PGA 214 before being converted to a digital signal by the A/D converter 216 operating at a sampling rate of 125 MHz. The timing of the A/D converter 216 is controlled by the output of the timing recovery block 222. The resulting digital signal is properly transferred from the analog clock region to the receive clock region by the A/D FIFO 218. The output of the A/D FIFO 218 is also used by the AGC 220 to control the operation of the PGA 214.

The output of the A/D FIFO 218, along with the outputs from the A/D FIFOs of the other three constituent transceivers, are inputted to the pair-swap multiplexer block 224. The pair-swap multiplexer block 224 uses the four-dimensional pair-swap control signal from the receive section 204R of PCS block to sort out the four input signals and send the correct signals to the respective FeedForward Equalizers (FFE) 26 of the demodulator 226. This pair-swapping control is needed for the following reason. The trellis coding methodology used for the Gigabit transceivers (102 and 104 of FIG. 1) is based on the fact that a signal on each twisted pair of wire corresponds to a respective one-dimensional constellation, and that the signals transmitted over four twisted pairs collectively form a four-dimensional constellation. Thus, for the decoding to work, each of the four twisted pairs must be uniquely identified with one of the four dimensions. Any undetected swapping of the four pairs would result in erroneous decoding. In an alternate embodiment of the Gigabit transceiver, the pair-swapping control is performed by the demodulator 226, instead of the combination of the PCS receive section 204R and the pair-swap multiplexer block 224.

The demodulator 226 includes a FFE 26 for each constituent transceiver, coupled to a deskew memory circuit 36 and a decoder circuit 38, implemented in the illustrated embodiment as a trellis decoder. The deskew memory circuit 36 and the trellis decoder 38 are common to all four constituent transceivers. The FFE 26 receives the signal from the pair-swap multiplexer block 224. The FFE 26 is suitably implemented to include a precursor filter 28, a programmable inverse partial response (IPR) filter 30, a summing device 32, and an adaptive gain stage 34. The FFE 26 may be a Least-Mean-Squares (LMS) type adaptive filter which is configured to perform channel equalization as will be described in greater detail below.

The precursor filter 28 generates a precursor to the input signal 2. This precursor is used for timing recovery. The transfer function of the precursor filter 28 might be represented as $-\gamma+z^1$, with $\gamma$ equal to $\frac{1}{16}$ for short cables (less than 80 meters) and $\frac{1}{8}$ for long cables (more than 80 m). The determination of the length of a cable is based on the gain of the coarse PGA 14 of the programmable gain block 214.

The programmable IPR filter 30 compensates for the Intersymbol Interference ISI introduced by the partial response pulse shaping in the transmitter section of a remote transceiver 104 (shown in FIG. 1) which transmitted the analog equivalent of the digital signal 2. The transfer function of the IPR filter 30 may be expressed as $1/(1+Kz^{-1})$. In the present example, K has an exemplary value of 0.484375 during startup, and is slowly ramped down to zero after the convergence of the Decision Feedback Equalizer (DFE) included inside the trellis decoder 38. The value of K may also be any positive value less than 1.

The summing device 32 receives the output of the IPR filter 30 and subtracts therefrom adaptively derived cancellation signals received from the adaptive filter block, namely signals developed by the offset canceller 228, the NEXT cancellers 230, and the echo canceller 232. The offset canceller 228 is an adaptive filter which generates an estimate of signal offset introduced by component circuitry of the transceiver's analog front end, particularly offsets signals introduced by the PGA 214 and the AID converter 216.

The three NEXT cancellers 230 may also be described as adaptive filters and may be used, in the illustrative embodiment, for modeling the NEXT impairments in the received signal caused by the interference generated by symbols sent by the three local transmitters of the other three constituent transceivers. These NEXT impairments are recognized as being caused by a crosstalk mechanism between neighboring pairs of cables. Thus, the term near-end crosstalk, or NEXT is used to describe this type of impairment. Since each receiver has access to the data transmitted by the other three local transmitters, it is possible to approximately replicate the NEXT impairments through filtering. Referring to FIG. 2, the three NEXT cancellers 230 filter the signals sent by the PCS block to the other three local transmitters and produce three signals replacing the respective NEXT impairments. By subtracting these three signals from the output of the IPR filter 30, the NEXT impairments are approximately canceled.

Due to the bi-directional nature of the channel, each local transmitter causes an ECHO impairment on the received signal of the local receiver with which it is paired to form a constituent transceiver. In order to remove this impairment, an echo canceller 232 is provided, which may also be characterized as an adaptive filter, and may be used, in the illustrated embodiment, for modeling the signal impairment due to ECHO. The echo canceller 232 filters the signal sent by the PCS block to the local transmitter associated with the receiver, and produces an approximate replica of the echo impairment. By subtracting this replica signal from the output of the IPR filter 30, the echo impairment is approximately canceled.

The adaptive gain stage 34 receives the processed signal from the summing circuit 32 and fine tunes the signal path gain using a zero-forcing LMS algorithm. Since this adaptive gain stage 34 trains on the basis of the error signals generated by the adaptive filters 228, 230 and 232. The adaptive gain stage 34 provides a more accurate signal gain than the one provided by the PGA 214 in the analog section.

The output of the adaptive gain stage 34, which is also the output of the FFE 26, is input to the deskew memory circuit 36. The deskew memory 36 is a four-dimensional function block. Namely, the deskew memory 36 also receives the outputs of the three FFEs of the other three constituent transceivers. There may be a relative skew in the outputs of the four FFEs, which are the four signal samples representing the four symbols to be decoded. This relative skew can be up to 50 nanoseconds, and is because of the variations in the way the copper wire pairs are twisted. In order to correctly decode the four symbols, the four signal samples must be properly aligned. The deskew memory 36 aligns the four signal samples received from the four FFEs, then passes the deskewed four signal samples to a decoder circuit 38 for decoding.

In the context of the exemplary embodiment, the data received at the local transceiver was encoded before transmission, at the remote transceiver. In the present case, data might be encoded using an eight-state four-dimensional trellis code, and the decoder 38 might therefore be implemented as a trellis decoder. In the absence of ISI, a proper eight-state Viterbi decoder would provide optimal decoding of this code. However, in the case of Gigabit Ethernet, the Category-5 twisted pair cable introduces a significant amount of ISI. In addition, the partial response filter of the remote transmitter on the other end of the communication channel also contributes some ISI. Therefore, the trellis decoder 38 must decode both the trellis code and the ISI, at the high rate of 125 MHz. In the illustrated embodiment of the Gigabit transceiver, the trellis decoder 38 includes an eight-state Viterbi decoder, and uses a decision-feedback sequence estimation approach to deal with the ISI components.

The four-dimensional output of the trellis decoder 38 is provided to the PCS receive section 204R. The receive section 204R of the PCS block de-scrambles and decodes the symbol stream. The receive section 204R then passes the decoded packets and idle stream to the receive section 202T of the GMII block which passes the decoded packets to the MAC module. The four-dimensional outputs, which are the error and tentative decision, respectively, are provided to the timing recovery block 222, whose output controls the sampling time of the A/D converter 216. One of the four components of the error and one of the four components of the tentative decision correspond to the receiver shown in FIG. 2, are provided to the adaptive gain stage 34 of the FFE 26 to adjust the gain of the equalizer signal path. The error component portion of the decoder output signal is also provided, as a control signal, to adaptation circuitry (not shown) incorporated in each of the adaptive filters 230 and 232. Adaptation circuitry is used for the updating and training process of the filter coefficients.

Figure 3:
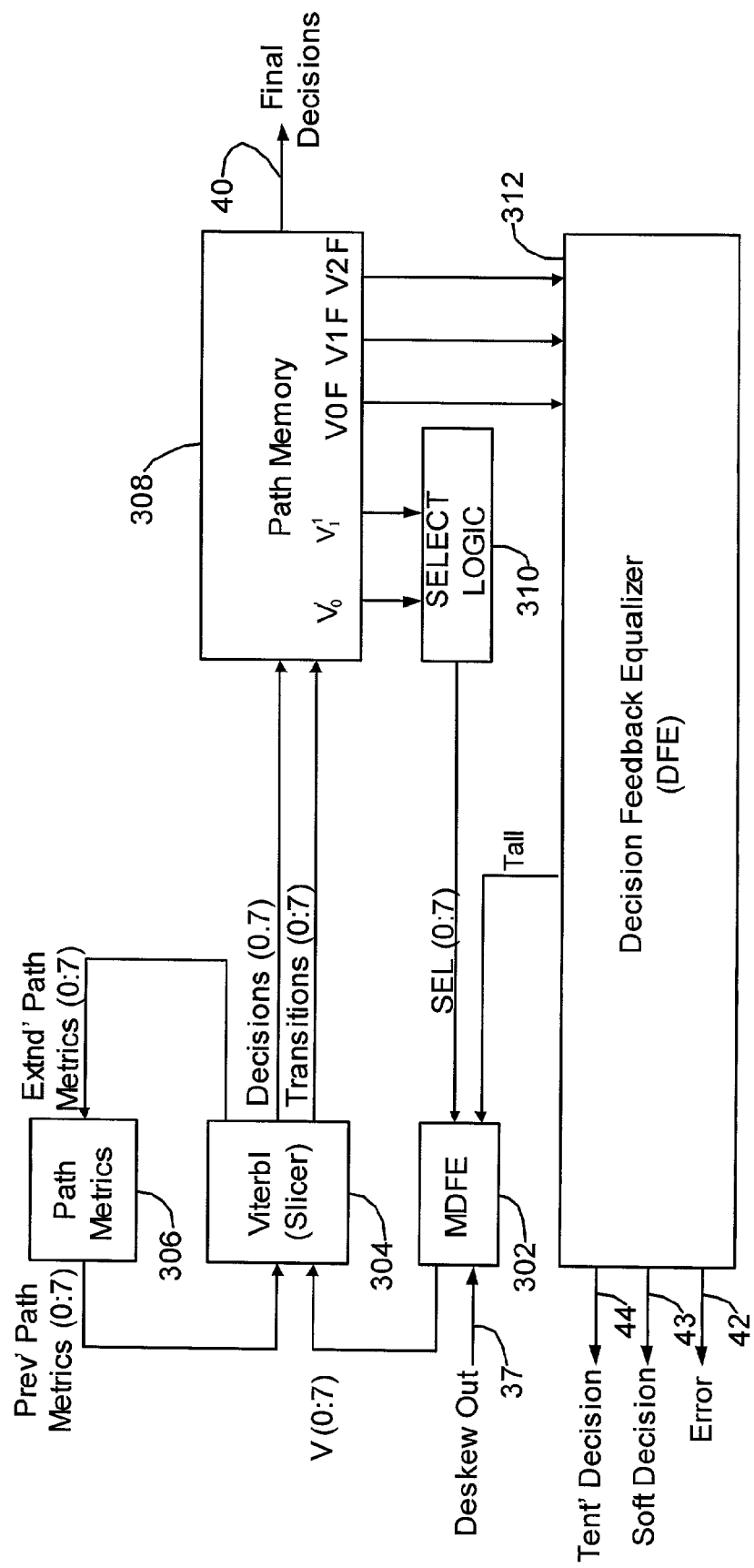
FIG. 3 is a schematic of an exemplary embodiment of a decoder of a single transceiver as shown in FIG. 2.

FIG. 3 is a block diagram of the trellis decoder 38 of FIG. 2. The trellis decoder 38 includes a multiple decision feedback equalizer (MDFE) 302, a Viterbi decoder 304, a path metrics module 306, a path memory module 308, a select logic 310, and a decision feedback equalizer 312.

The Viterbi decoder 304 performs four-dimensional slicing of the Viterbi inputs provided by the MDFE 302 and computes the branch metrics. Based on the branch metrics and the previous path metrics received from the path metrics module 306, the Viterbi decoder 304 extends the paths and computes the extended path metrics. The Viterbi decoder 304 selects the best path incoming to each of the eight states, updates the path memory stored in the path memory module 308 and the path metrics stored in the path metrics module 306.

The computation of the final decision and the tentative decisions are performed in the path memory module 308 based on the 4D symbols stored in the path memory for each state. At each iteration of the Viterbi algorithm, the best of the eight states, i.e., the one associated with the path having the lowest path metric, is selected. The four-dimensional symbol from the associated path stored at the last level of the path memory is selected as the final decision 40 and provided to the receive section of the PCS 204R (FIG. 2). Symbols at the lower depth levels are selected as tentative decisions, which are used to feed the delay line of the DFE 312.

The number of the outputs $V_i$ to be used as tentative decisions depends on the required accuracy and speed of the decoding operation. A delayed version of $V_{0F}$ is provided as the four-dimensional tentative decision 44 (FIG. 2) to the Feed-Forward Equalizers 26 of the four constituent transceivers and the timing recovery block 222 (FIG. 2).

Based on the symbols $V_{0F}$, $V_{1F}$, and $V_{2F}$, the DFE 312 produces the intersymbol interference (ISI) replica associated with all previous symbols except the two most recent (since these symbols were derived without using the first two taps of the DFE 312. The ISI replica is fed to the MDFE 302 (this ISI replica is denoted as the "tail component"). The MDFE 302 computes the ISI replica associated with all previous symbols including the two most recent symbols, subtracts it from the output 37 of the deskew memory block 36 (FIG. 2) and provides the resulting outputs as Viterbi inputs to the Viterbi decoder 304.

The DFE 312 also computes an ISI replica associated with the two most recent symbols, based on tentative decisions $V_{0F}$, $V_{1F}$, and $V_{2F}$. This ISI replica is subtracted from a delayed version of the output 37 of the de-skew memory block 36 to provide the soft decision 43. The tentative decision $V_{0F}$ is subtracted from the soft decision 43 to provide the error 42. There may be three different versions of the error 42, which are 42enc, 42ph and 42dfe (not shown). The error 42enc is provided to the echo cancellers 232 and NEXT cancellers 230 of the constituent transceivers. The error 42ph is provided to the FFEs 26 (FIG. 2) of the four constituent transceivers and the timing recovery block 222. The error 42dfe is used for the adaptation of the coefficients of the DFE 312. The tentative decision 44 shown in FIG. 3 is a delayed version of $V_{0F}$. The soft decision 43 may only be used for display purposes.

For the exemplary Gigabit transceiver system 200 described above and shown in FIG. 2, there are design considerations regarding the allocation of boundaries of the clock domains. These design considerations are dependent on the clocking relationship between the transmitters and receivers in a Gigabit transceiver. Therefore, this clocking relationship will be discussed first.

During a bi-directional communication between two Gigabit transceivers 102, 104 (FIG. 1), through a process called "auto-negotiation", one of the Gigabit transceivers assumes the role of the master while the other assumes the role of the slave. When a Gigabit transceiver assumes one of the two roles with respect to the remote Gigabit transceiver, each of its constituent transceivers assumes the same role with respect to the corresponding one of the remote constituent transceivers. Each constituent transceiver 108 may be constructed such that it can be dynamically configured to act as either the master or the slave with respect to a remote constituent transceiver 108 during a bi-directional communication. The clocking relationship between the transmitter and receiver inside the constituent transceiver 108 may depend on the role of the constituent transceiver (i.e., master or slave) and may be different for each of the two cases.

Figure 4:
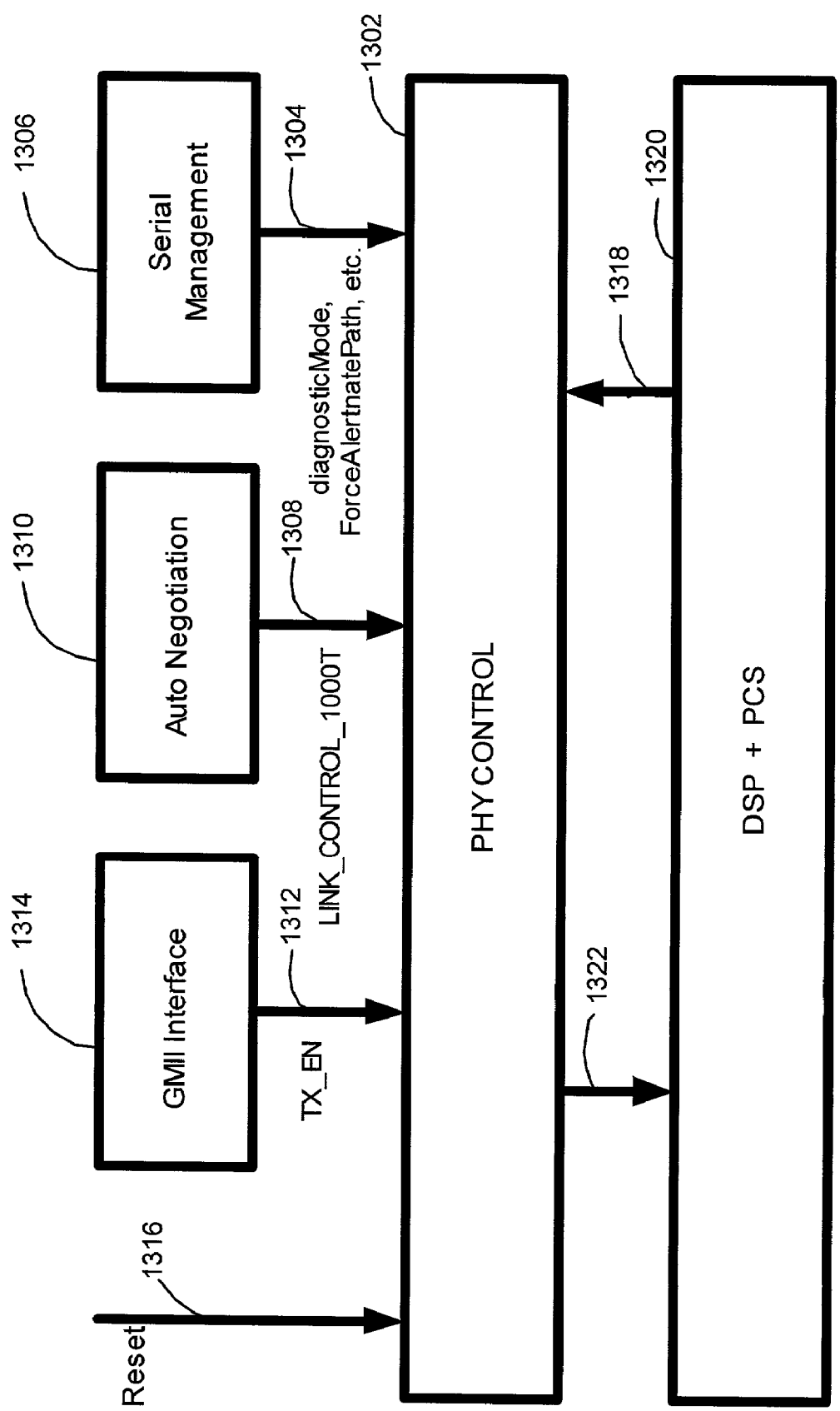
FIG. 4 is an exemplary systems architecture for an exemplary embodiment of a state machine controlling the exemplary transceiver embodiments.

FIG. 4 is a high-level block diagram of the Gigabit transceiver illustrating the interactions between the Physical Control (PHY Control) module 1302 and other modules of the Gigabit transceiver. The PHY Control module implements state machines to control the Gigabit transceiver. The PHY Control module receives user-defined signals 1304 from the Serial Management module 1306, link control signals 1308 from the Auto Negotiation module 1310, transmit enable signals from the GMII module 1314, and status signals 1318 from the Digital Signal Processing (DSP) module and the Physical Coding Sublayer (PCS) module 1320. The PHY Control module can also receive a reset signal 1316 directly from a user to reset all state machines of the PHY Control module and to reset the DSP and PCS modules.

Based on the signals the PHY Control module receives and its internal states, the PHY Control module outputs control signals 1322 to the DSP and PCS modules to control the operations of these two modules. The DSP module includes all the blocks that are in the Receive Clock domain as shown in FIG. 2, except the Receive PCS 2048 and the Receive GMII 202R.

Inputs to the Serial Management module 1306 may be provided by a user or by software, and, for simplicity of design, can be stored and read out serially as the user-defined signals 1304. Examples of user-defined signals 1304 are DiagnosticMode (to operate the Gigabit transceiver in diagnostic mode) and ForceAlternatePath (to force a state machine of the PHY Control module to take an alternate path) as shown in FIG. 4.

The Link_Control_1000T signal 1308 from the Auto Negotiation module indicates whether a link is to be established with a remote transceiver 104. The transmit enable signal 1312 from the GMII module indicates whether transmission of packets can start.

The PHY Control module 1302 can reset the DSP and PCS modules 1320. The term "reset" means initializing every component, including clearing all registers.

The PHY Control module controls the convergence of the Echo cancellers 232 and NEXT cancellers 230 (FIG. 2), the DFE 312 (FIG. 3) and the Timing Recovery block 222 (FIG. 2). The PHY Control module may also control the ramping down of the parameter k of the Inverse Partial Response (IPR) filter 30 (FIG. 2) during the startup of the Gigabit transceiver.

The PHY Control module 1302 controls the alignment function of the Receive PCS 2048. As the signals stated previously, the PCS aligns the four signals received over the four pairs and deskews before they are provided to the decoder 38 (FIG. 2).

Figure 5:
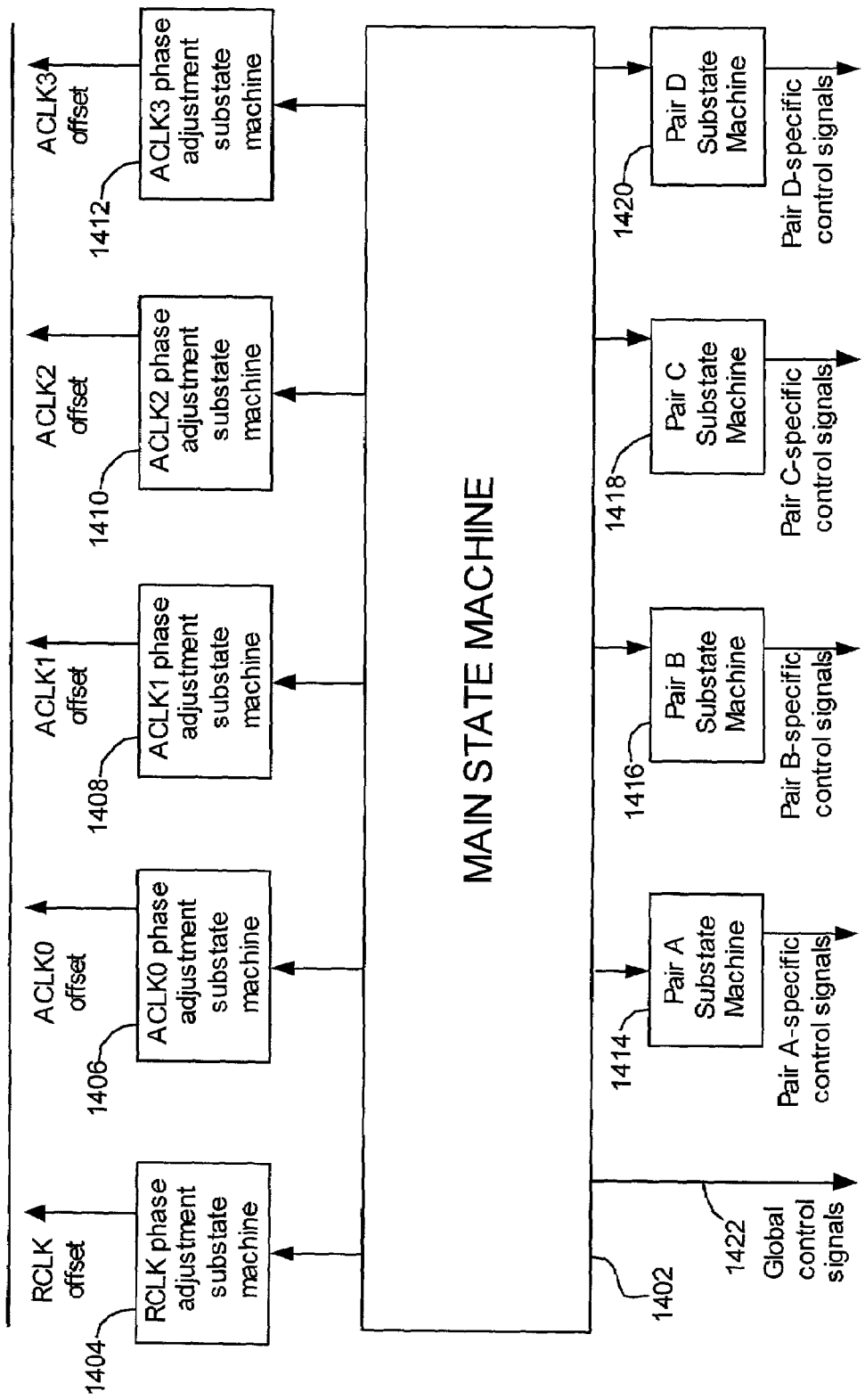
FIG. 5 is an exemplary embodiment of a state machine capable of controlling the exemplary transceiver embodiments.

As shown in FIG. 5, the PHY Control module 1302 optimizes the phase of the receive clock RCLK relative to the phases of the four sampling clocks ACLK0–ACLK3 to minimize the effect of switching noise on the (FIG. 2).

The PHY Control module 1302 performs small adjustments to the phases of the four sampling clocks ACLK0–ACLK3 to further optimize the system performance.

The PHY Control module 1302 re-centers the A/D FIFO 218 and the FIFOs 234 (FIG. 2) after timing acquisition and phase adjustments of the receive clock RCLK and sampling clocks ACLK0–ACLK3.

The PHY Control module 1302 implements various test modes such as the Diagnostic Mode, Alternate Path and Loopback. In Loopback mode, referring to FIG. 2, signals output from the Transmit PCS 204T pass through the FIFOs 234 then loop back directly to the Receive PCS 204R without passing through any other block.

The PHY Control module 1302 monitors the performance of the receiver during normal operation. If the receiver performance drops below a predetermined level, the PHY Control module 1302 retrains the receiver.

FIG. 5 illustrates the hierarchical structure of the PHY Control module 1302 (FIG. 4). The PHY Control module 1302 (FIG. 4) includes a main state machine 1402 that controls operations of a set of substate machines.

The RCLK phase adjustment substate machine 1404 outputs the control signal RCLK offset to the Timing Recovery block 222 (FIG. 2) to adjust the phase of the receive clock RCLK. Each of the ACLKx (x=0, . . . ,3) phase adjustment substate machines 1406, 1408, 1410, 1412 outputs a respective ACLKx offset to adjust the phase of the corresponding sampling clock ACLKx (x=0, . . . ,3).

The main state machine 1402 controls four pair-specific substate machines 1414, 1416, 1418, 1420, each of which is specific to one of the four constituent transceivers (also called pairs) A, B, C, D. Each of these four substate machines outputs control signals that are specific to the corresponding constituent transceiver. The main state machine 1402 also outputs global control signals 1422 to all four pairs of the constituent transceivers.

The four constituent receivers converge independently. Each constituent transceiver is controlled by a separate pair-specific substate machine (1414, 1416, 1418, 1420). Such a configuration allows retries of the convergence of one constituent receiver in the case the convergence fails the first attempt, without having to reset the other constituent receivers that succeed. Within each pair-specific substate machine, different substate machines are used for convergence of the Master Echo/NEXT cancellers, convergence of the Master DFE, convergence of the Slave Echo/NEXT cancellers, and convergence of the Slave DFE.

Most parts of the PHY Control module 1302 (FIG. 4) can operate at much lower clock rates to reduce the power dissipation in PHY Control module 1302 (FIG. 4). For example, most of the PHY Control module 1302 (FIG. 4) can operate at the clock rate of $f_s/1024$, i.e., 122 kHz. The clock rate for RCLK offset may be $f_s/16$. The clock rate for the control signal for AGC 220 (FIG. 2) may be $f_s/128$. The clock rate for the control signal which updates the Offset canceller 228 may be $f_s/4$.

PHY Control module 1302 (FIG. 4) includes a mean square error (MSE) computation block for each constituent transceiver to compute the MSE of the respective constituent transceiver. The MSE is compared with different thresholds to provide control signals EnergyDetect, MSEOK1, MSEOK2, MSEOK3 which are used by the main state machine and the substate machines of PHY Control module 1302 (FIG. 4).

Figure 6:
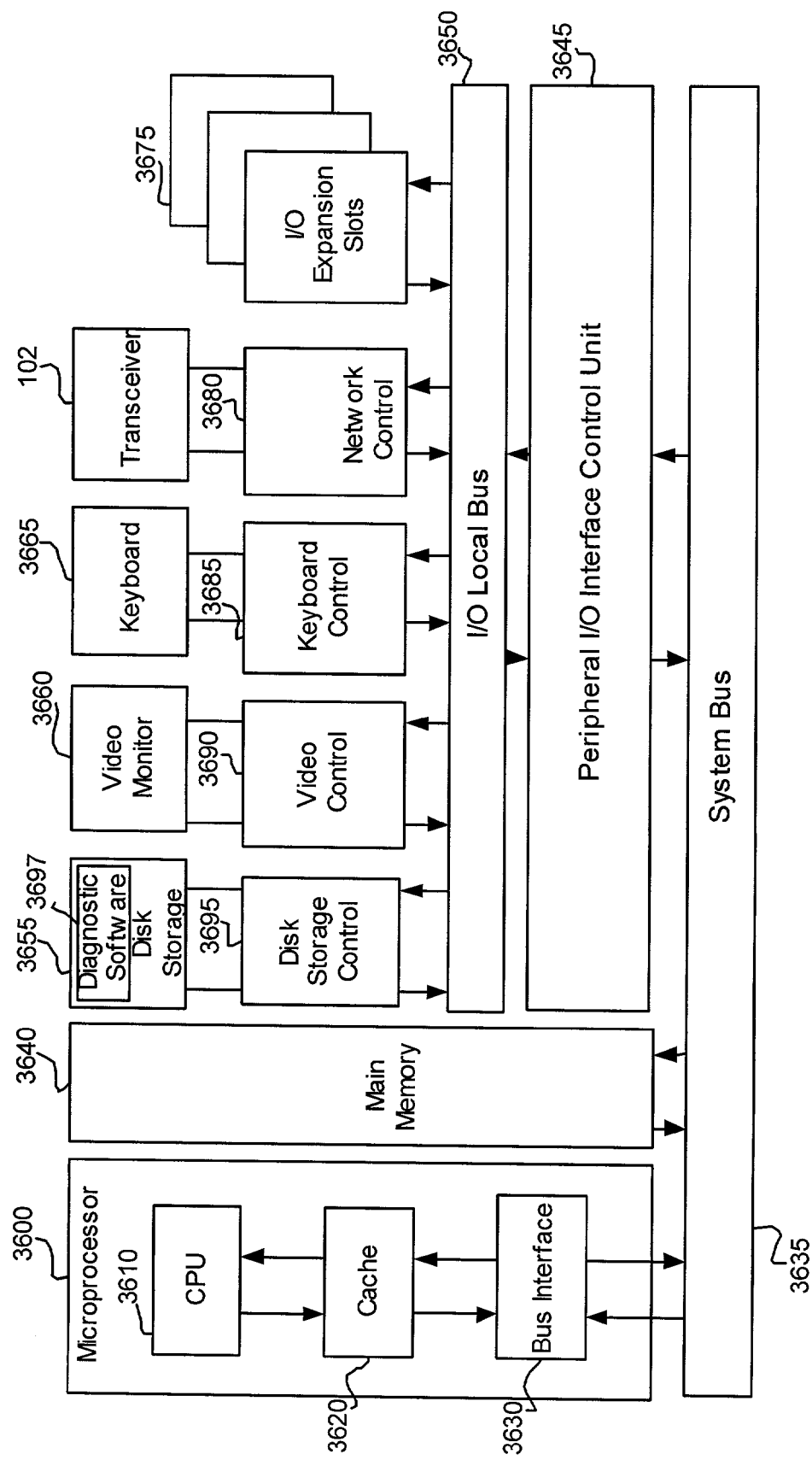
FIG. 6 is an exemplary embodiment of a computer system incorporating the exemplary transceiver embodiments.

FIG. 6 is an exemplary embodiment of a computer system incorporating the exemplary transceivers embodiment of FIGS. 10 through 14. Microprocessor 3600, including a Central Processing Unit (CPU) 3610, memory cache 3620, and bus interface 3630, is operably coupled via system bus 3635 to main memory 3640 and I/O control unit 3645. The I/O interface control unit is coupled via I/O local bus 3650 to disk storage controller 3695, video controller 3690, keyboard controller 3685, and network controller 3680. The disk storage controller 3695 is coupled to disk storage device 3655. The video controller 3690 is coupled to video monitor 3660. The keyboard controller 3685 is coupled to keyboard 3665. The network controller 3680 is coupled to exemplary transceivers embodiment 102.

In operation, a diagnostic state machine implemented in the transceiver collects and stores diagnostic data signals in the transceiver's RAM. The diagnostic software is read from the disk storage device into the main memory by the microprocessor. The microprocessor executes the computer instructions contained within the diagnostic software, thus serving as a host for a transceiver diagnostic system. The transceiver diagnostic system accesses the registers and RAM in the exemplary transceiver. The exemplary transceiver diagnostic system receives user commands via the keyboard and displays diagnostic results to a user using the video monitor.

Figure 7:
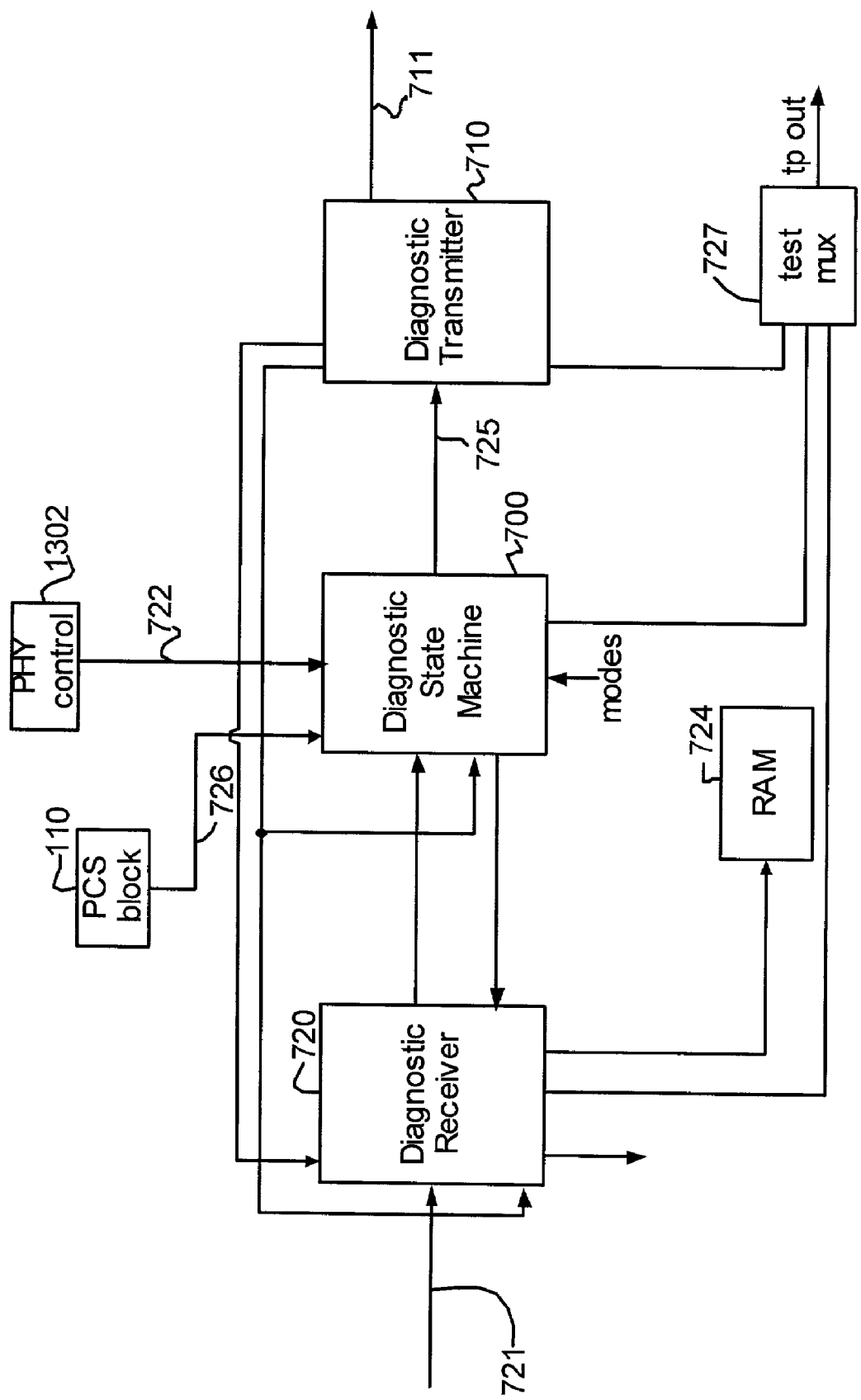
FIG. 7 is an architecture diagram depicting a diagnostic state machine controlling a transmitter and a receiver according to an embodiment of the invention.

FIG. 7 is an architecture diagram depicting an exemplary embodiment of a diagnostic state machine controlling a transmitter and a receiver within the previously described 1000Base-T implementation in accordance with the present invention. A diagnostic state machine 700 for the control of a diagnostic data collection process is operably coupled to a diagnostic transmitter 710 for the transmission of diagnostic pulse signals 711, a diagnostic receiver 720 for the reception of diagnostic data signals 721, a previously described PHY control module 1302 for the initiation of a diagnostic data collection process, and a previously described PCS layer module 110 for the detection of communication reception errors. The diagnostic receiver 720 is operably coupled to a diagnostic data storage RAM 724 for the storage of diagnostic data. In one embodiment, the diagnostic state machine, diagnostic transmitter, diagnostic receiver, and diagnostic data storage RAM are located on a single device in a 1000Base-T implementation.

In operation, the diagnostic state machine 700 receives from the PCS layer module error signals 725 indicating that a reception error has occurred on a previously described twisted-pair cable. This error signal 726 may be used by the diagnostic state machine 700 to trigger a diagnostic data collection process. The diagnostic state machine 700 sends control signals 725 to the diagnostic transmitter 710 to establish communications with a remote transceiver 104 using diagnostic pulse signals 711. The diagnostic state machine 700 issues control signals 725 to the diagnostic transmitter 710 to start sending diagnostic test signals 2422 through one or more of the previously described twisted-pair cables. The diagnostic state machine 700 issues control signals to the diagnostic receiver to start receiving diagnostic data signals on one or more of the previously described twisted-pair cables resulting from reflection of the diagnostic test signals 2422 from impedance mismatches or crosstalk between the twisted pair cables. The resultant received diagnostic data signals are digitized and stored in the RAM for retrieval and analysis by another software process. The signals generated in the diagnostic receiver 720, the diagnostic state machine 700 and the diagnostic transmitter 710 may be transmitted to a test multiplexer 727 to generate an output signal.

In one embodiment of the invention, a diagnostic data collection process by a diagnostic state machine 700 is initiated at the request of an external software entity.

In another embodiment of the invention, the diagnostic state machine 700 can collect diagnostic data in one of several modes. In one mode, the diagnostic state machine is operably coupled to another diagnostic state machine through the communications link. In this mode, the diagnostic state machines 700 negotiate with each other to enter into a master/slave relationship in an autonegotiation process. After one of the diagnostic state machines 700 establishes itself as the master diagnostic state machine, the master diagnostic state machine issues commands to the slave diagnostic state machine and the slave diagnostic state machine assists the master diagnostic state machine in collecting diagnostic data signals. In this mode, ECHO, NEXT, and FEXT data can be collected.

In another mode, the diagnostic state machine 700 is operably coupled to a transceiver that does not contain a similar diagnostic state machine. In this case, the diagnostic state machine is capable of collecting ECHO and NEXT data.

In another mode, the diagnostic state machine is not operably coupled to another transceiver. In this case, both ECHO and NEXT data signals are collected for analysis.

Figure 8:
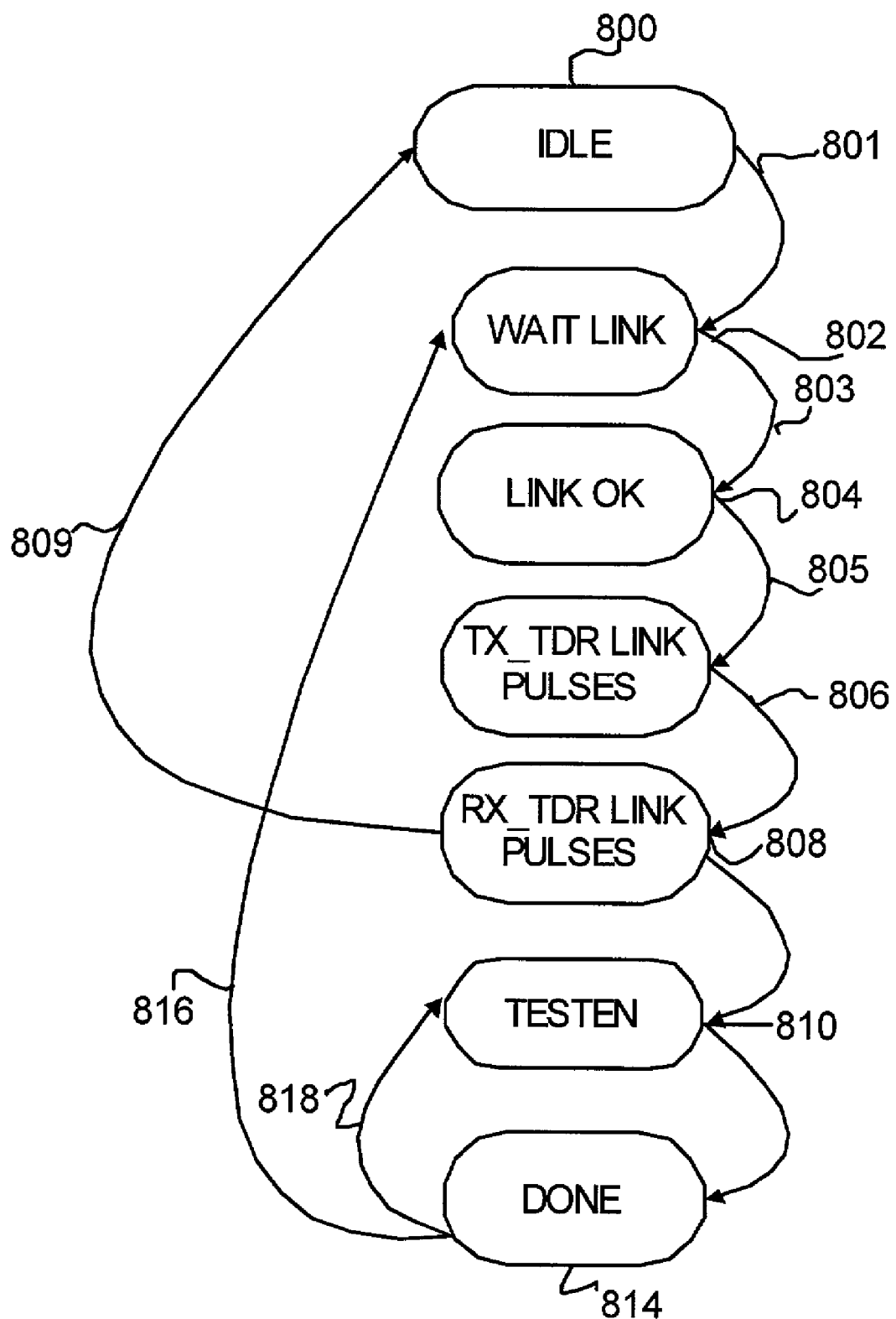
FIG. 8 is a state diagram of an embodiment of a master state machine that performs an ECHO or a NEXT data collection process with the assistance of a slave state machine.

FIG. 8 is a state diagram of an exemplary embodiment of a master diagnostic state machine included in a diagnostic state machine in accordance with the present invention. The master diagnostic state machine performs an ECHO or a NEXT data collection process with the assistance of a slave diagnostic state machine. A diagnostic state machine coupled to another diagnostic state machine may become a master diagnostic state machine or a slave diagnostic state machine depending on the results of the autonegotiation process between the coupled diagnostic state machines. A diagnostic state machine sits in an idle state 800 sending until the diagnostic is enabled and detects 801 that the diagnostic state machine is coupled to a communications link. Once operably coupled to a communications link, the diagnostic state machine enters a waitlink 802 state. In the waitlink state 802, the diagnostic state machine determines 803 if there is a communications link to another diagnostic state machine. If the diagnostic state machine determines that there is a communication link, the diagnostic state machine enters a link OK state 804.

In the link OK state, the master diagnostic state machine then transitions to a receive diagnostic pulse signal state 808 in which the master diagnostic state machine waits to receive the diagnostic pulse signals from the slave diagnostic state machine. These exchanged diagnostic pulse signals continue throughout the process of collecting diagnostic data signals by the master diagnostic state machine. The master and slave diagnostic state machines use these diagnostic pulse signals to confirm that the diagnostic data collection process is still active. If the master diagnostic state machine ceases receiving the diagnostic pulse signals, the master diagnostic state machine transitions 809 back the idle state.

If diagnostic pulse signals are received from the slave diagnostic state machine, the master diagnostic state machine enters a test enabled state 810 and sends diagnostic test signals through the communications link and monitors the communications link for signal reflection and crosstalk induced diagnostic data signals and stores them in the previously described storage RAM. The master diagnostic state machine transitions to a done state 814 when the diagnostic data collection session is completed. From the done state 814, the master diagnostic can either transition 816 to the waitlink state 802 or perform another test 818.

In one embodiment of a master diagnostic state machine in accordance with the present invention, the master diagnostic state machine transmits diagnostic pulse signals to the slave diagnostic state machine via a first channel of the communications link and receives diagnostic pulse signals from the slave diagnostic state machine on a second channel of the communications link. The master diagnostic state machine then transmits diagnostic test signals and receives ECHO or NEXT data signals on any of the four channels of the communications link.

In one embodiment of a master diagnostic state machine in accordance with the present invention, the master diagnostic state machine transmits a diagnostic test signal on a channel in the communications link and receives ECHO diagnostic data signals on the same channel.

In one embodiment of a master diagnostic state machine in accordance with the present invention, the master diagnostic state machine transmits a test signal on a channel of the communications link and receives NEXT data signals on a different channel of the communications link.

Figure 9:
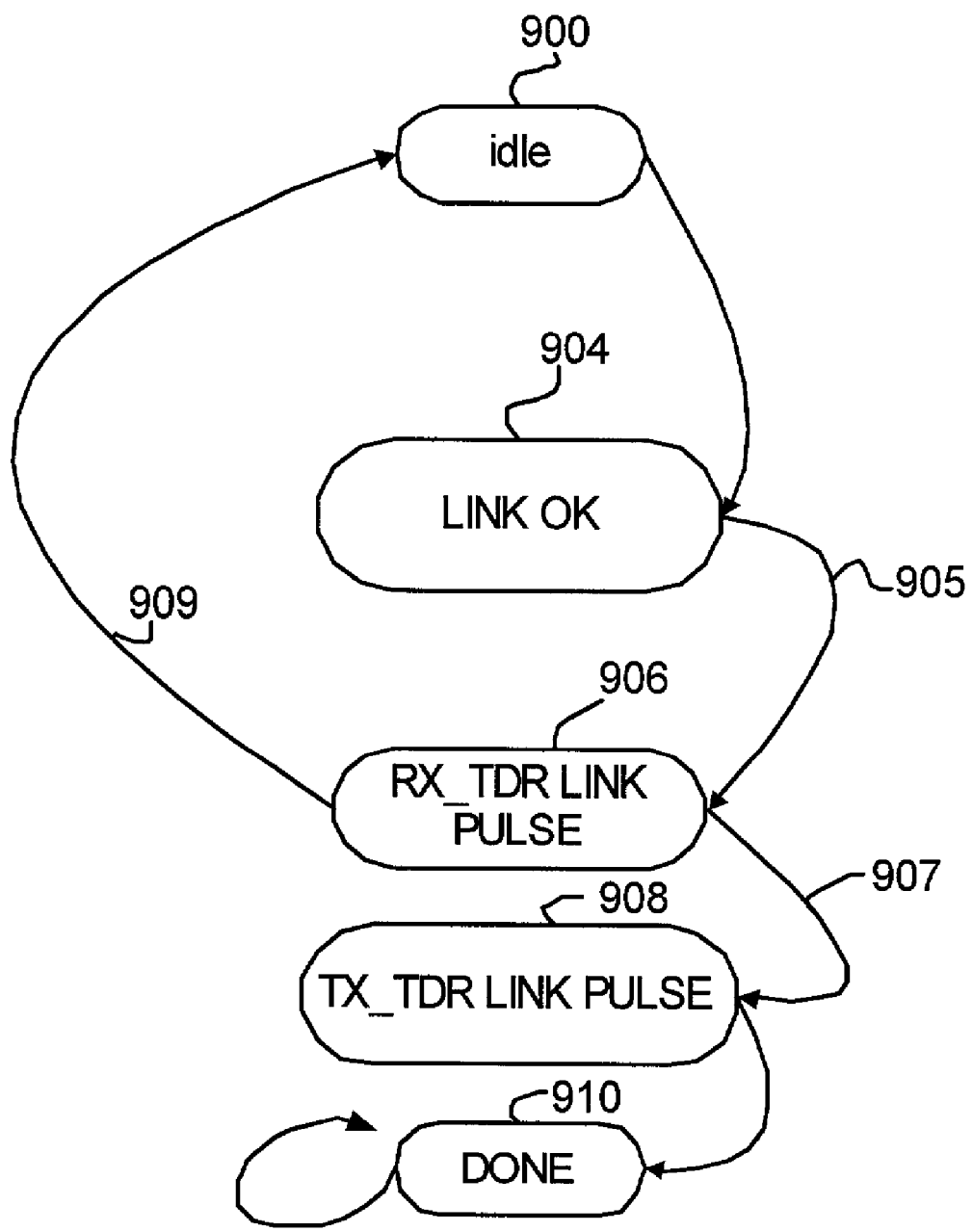
FIG. 9 is a state diagram of an embodiment of a slave state machine that assists in an ECHO or a NEXT data collection process.

FIG. 9 is a state diagram of an exemplary embodiment of a slave diagnostic state machine in accordance with the: invention. The slave diagnostic state machine assists a master diagnostic state machine in an ECHO or a NEXT data collection process. A diagnostic state machine becomes a slave diagnostic state machine as discussed in the previously described autonegotiation sequence. A diagnostic state machine sits in an idle state 900 until it detects that it is operably coupled to a communications link.

Once operably coupled to a communications link, the diagnostic state machine determines that it is a slave diagnostic state machine and enters a link OK state 904. The slave diagnostic state machine transitions 905 to receive diagnostic pulse signal state 906 and begins receiving diagnostic pulse signals from the master diagnostic state machine. If the slave diagnostic state machine ceases receiving the diagnostic pulse signals, the slave diagnostic state machine transitions 909 back the idle state. The slave diagnostic state machine transitions 907 to a transmit diagnostic pulse signal state 908 in which the slave diagnostic state machine transmits diagnostic pulse signals to the master diagnostic state machine. The slave diagnostic state machine then transitions to a done state 910 while maintaining the diagnostic pulse signal.

In one embodiment of a slave diagnostic state machine in accordance with the present invention, the slave diagnostic state machine receives diagnostic pulse signals from the master diagnostic state machine via a first channel of the communications link and transmits diagnostic pulse signals to the master diagnostic state machine on a second channel of the communications link. The master diagnostic state machine then transmits and receives ECHO or NEXT signals on any channel of the communications link.

Figure 10:
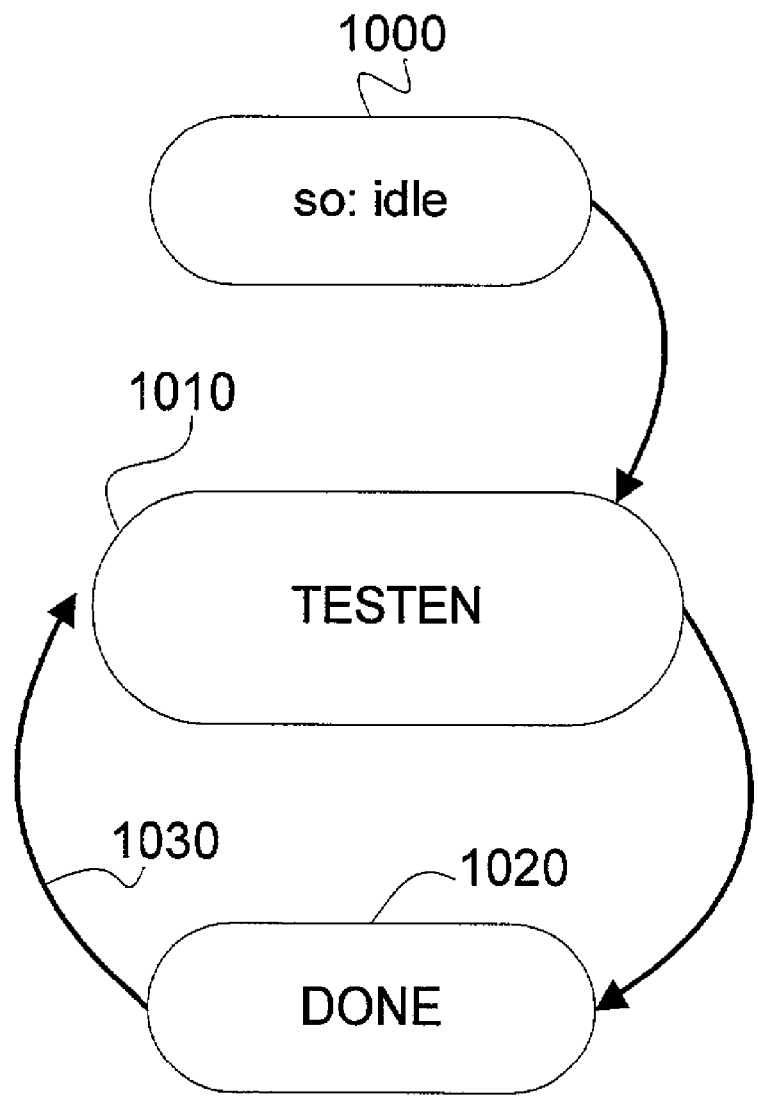
FIG. 10 is a state diagram of an embodiment of a master state machine for collection of ECHO or NEXT data without the assistance of a slave state machine.

FIG. 10 is a state diagram of an embodiment of a master diagnostic state machine for collection of ECHO or NEXT data without the assistance of a slave state machine. A diagnostic state machine starts in an idle state 1000 and transitions 1001 to a test enabled state 1010 when the diagnostic state machine detects that there is no other compatible communications device operably coupled to a communications link. The diagnostic state machine assumes the role of master diagnostic state machine without an autonegotiation process because there is no other diagnostic state machine with which to establish a slave/master relationship.

The master diagnostic state machine then transmits test signals through the operably coupled communications link. The diagnostic state machine monitors the communications link for signal reflections and cross talk between the twisted cable pairs. The master diagnostic state machine receives the reflected and crosstalk induced signals and stores them in the previously described storage RAM and transitions to a done state 1020. From the done state, the master diagnostic can transition 1030 to the test enabled state and perform another diagnostic data collection process or transition back to idle if diagnostic mode is disabled.

In one embodiment of a master diagnostic state machine in accordance with the invention, the master diagnostic state machine transmits a diagnostic test signal on a channel included in the communications link and receives diagnostic response signals on the same channel.

In one embodiment of a master diagnostic state machine in accordance with the present invention, the master diagnostic: state machine transmits a NEXT test signal on a first channel of the communications link and receives NEXT response signals on a second channel of the communications link.

Figure 11:
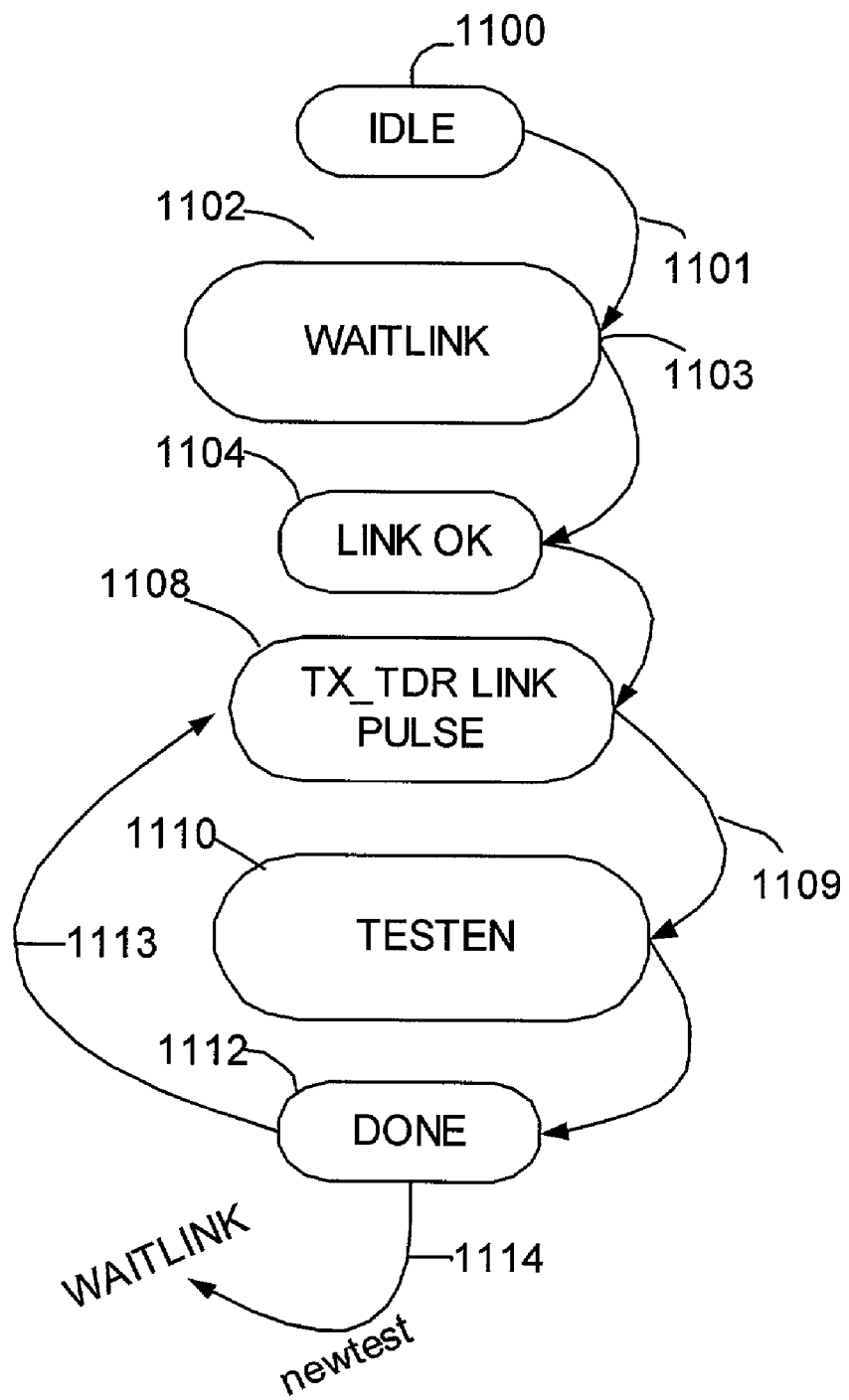
FIG. 11 is a state diagram of an embodiment of a master state machine that performs a FEXT data collection process with the assistance of a slave state machine.

FIG. 11 is a state diagram of an embodiment of a master diagnostic state machine that performs a FEXT data collection process with the assistance of a slave diagnostic state machine. A diagnostic state machine sits in an idle state 1100 until the diagnostic mode is enabled and transitions 1101 to a waitlink 1102 state.

During a FEXT data collection process, a master diagnostic state machine employs the assistance of a slave diagnostic state machine to send diagnostic test signals through one channel of the communications link while the master diagnostic state machine receives far end crosstalk data signals on other channels of the communication link. To coordinate the transmission and reception of the diagnostic test signals, the master diagnostic state machine waits at a waitlink state 1102 for the previously described slave and master DFEs to converge on at least one channel of the communications link indicating that the clocking signals used by the master and slave diagnostic state machines have synchronized.

The master diagnostic state machine transitions 1103 to a link OK state 1104 and sends 1106 a command to the slave diagnostic state machine to begin transmitting a diagnostic test signal, the channel to send the test signal along and the width of the diagnostic test signal. The master state machine transitions to a transmit diagnostic pulse signal state 1108 and waits for a start pattern sent by the slave diagnostic state machine. The master diagnostic state machine transitions 1109 to a test enabled state 1110 and receives and stores the diagnostic test signal transmitted by the slave diagnostic state machine. The master diagnostic state machine then moves to a done state 1112 from which it transitions 1113 to the diagnostic pulse signal state 1108 and restarts the test or returns 1114 to the waitlink state 1102.

Figure 12:
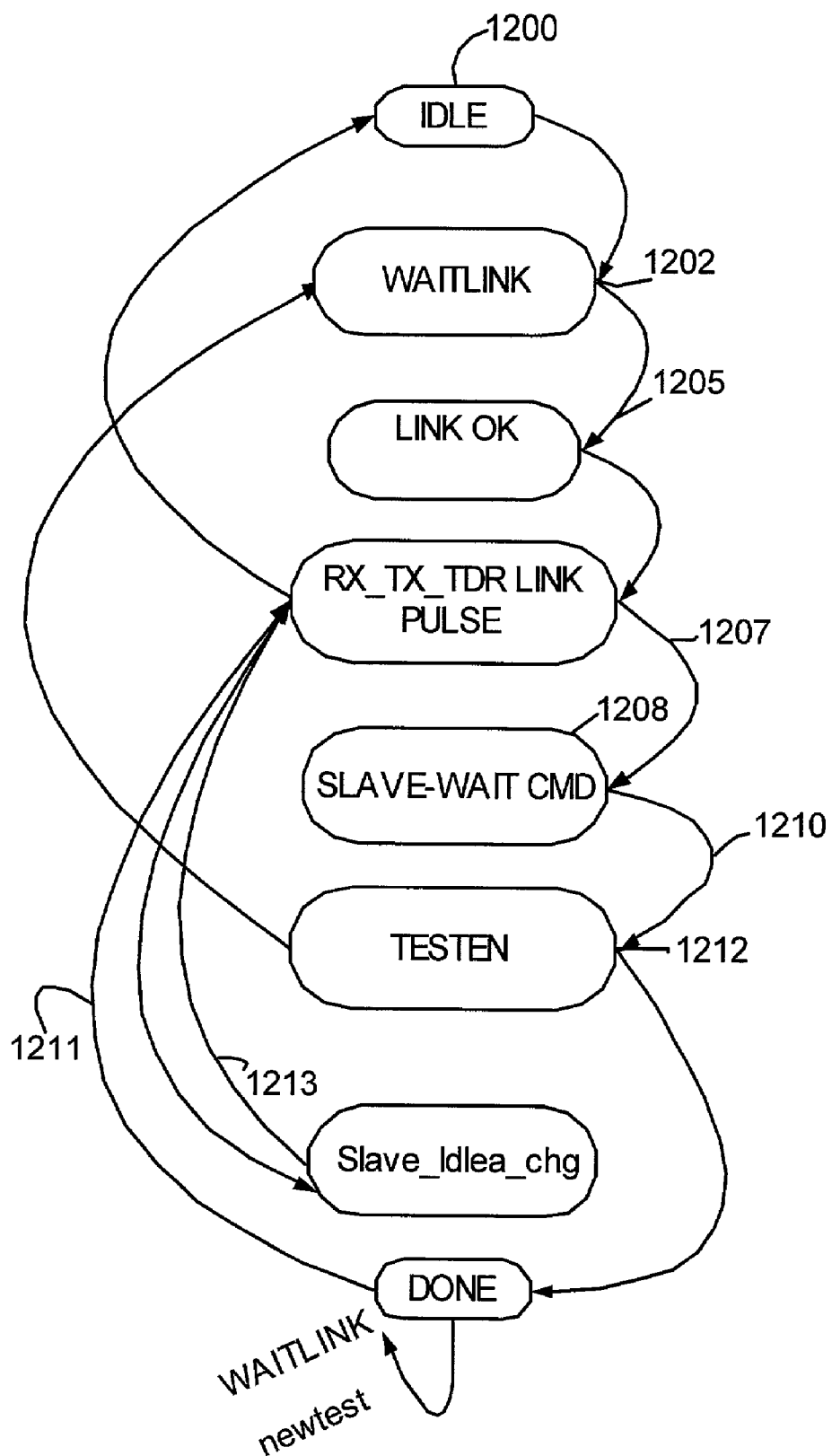
FIG. 12 is a state diagram of an embodiment of a slave state machine that assists in a FEXT data collection process.

FIG. 12 is a state diagram of an embodiment of a slave state machine that assists in a FEXT data, collection process. A diagnostic state machine becomes a slave diagnostic state machine in the previously described autonegotiation sequence. A diagnostic state machine sits in an idle state 1200 until the diagnostic mode is enabled. Once operably coupled to a communications link, the diagnostic state machine enters a waitlink 1202 state where it performs an autonegotiation with another diagnostic state machine active on an external transceiver operably coupled to the communications link. During the autonegotiation, one of the diagnostic state machines is established as the master diagnostic state machine and one of the diagnostic state machines is established as a slave diagnostic state machine.

Once the autonegotiation is over, the slave diagnostic enters a link OK state 1204. In the link OK state, the slave diagnostic state machine attempts to establish which channels in the communication link should be used to send the test pulse signal along and which channel should be used for the reception of the diagnostic command signals from the master diagnostic state machine. To do so, the slave diagnostic state machine transmits an idle signal on a first channel of the communications link. The slave diagnostic state machine then transitions 1205 to a receive diagnostic pulse signal state 1206. If the slave diagnostic state machine does not receive diagnostic pulse signals from the master diagnostic state machine, the slave diagnostic state machine transitions 1211 to an idle signal change state 1212. In the idle signal change state, the slave diagnostic state machine ceases transmitting the idle signal on the first channel of the communications link and begins transmitting the idle signal on a second channel of the communications link. The slave diagnostic state machine then transitions 1213 back to the receive diagnostic pulse signal state 1206. The slave diagnostic state machine repeats this process until it either receives a diagnostic pulse signal from the master diagnostic state machine or until it has transmitted idle signals through each channel in the communications link. If the slave diagnostic state machine tries all of the channels of the communication link and never receives a diagnostic pulse signal from the master diagnostic state machine, the slave diagnostic state machine transitions 1215 to the idle state.

If the slave diagnostic state machine does begin receiving link diagnostic pulse signals from the master diagnostic state machine, it transitions 1207 to a command wait state 1208. On receiving a transmit FEXT signal command, the slave diagnostic state machine transitions 1210 to a test enabled state 1212. While in the test enabled state, the slave diagnostic state machine transmits, a diagnostic test signal via a selected channel of the communications link to the master diagnostic state machine. The selected channel is chosen by the master diagnostic state machine with the identification of the channel encoded in the diagnostic command signal.

The slave diagnostic state machine transitions 1215 to a done state 1214 after the slave diagnostic state machine receives a signal indicating that the master diagnostic state machine has received and stored FEXT data signals generated by the transmission of the diagnostic test signal by the slave diagnostic state machine.

Figure 13:
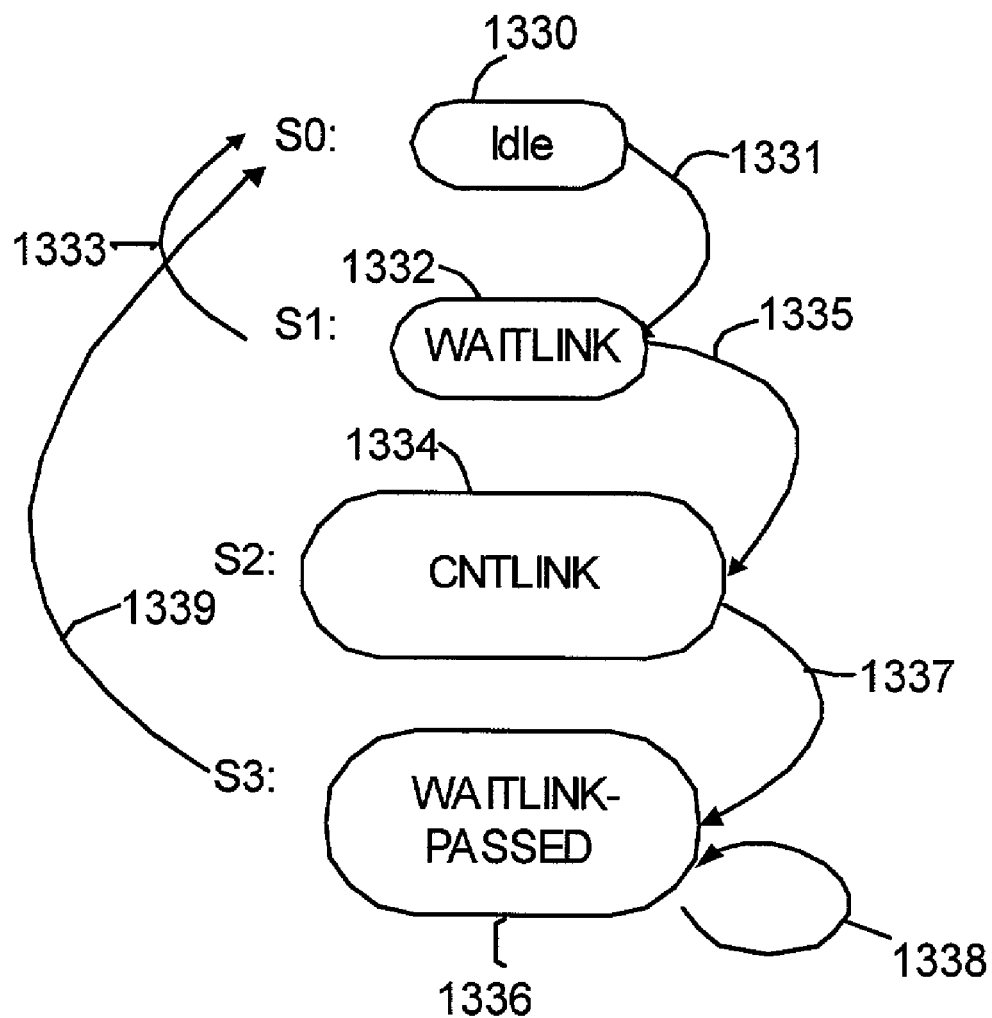
FIG. 13 is a state diagram of an embodiment of a state machine for detecting a diagnostic pulse signal.

FIG. 13 is a state diagram of an embodiment of a diagnostic state machine for detecting a diagnostic pulse signal. At an idle state 1330, the diagnostic state machine waits to receive a diagnostic pulse signal. When the diagnostic state machines detects the first diagnostic pulse signal, the diagnostic state machine transitions 1331 to a waitlink state 1332. In the waitlink state, the diagnostic state machine may timeout because too much time may elapse before another diagnostic pulse signal is received and the diagnostic state machine transitions 1333 back to then idle state 1330.

If the diagnostic state machine receives a second diagnostic pulse signal, the diagnostic state machine transitions 1335 to a cntlink state 1334. In the cntlink state 1334, the diagnostic states machine sets a link detected signal and transitions 1337 to passed waitlink state 1336. If the diagnostic state machine continues to detect diagnostic pulse signals, the diagnostic state machine remains 1338 in the passed waitlink state. When no more diagnostic pulse signals are received, the diagnostic state machine transitions 1339 back to the idle state.

Figure 14:
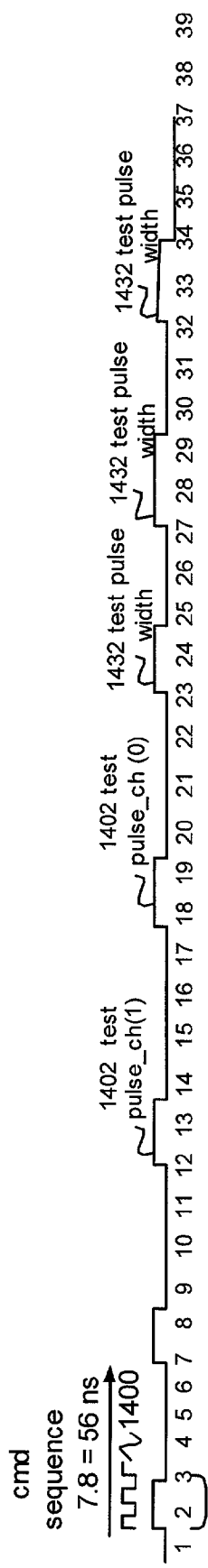
FIG. 14 is a timing diagram of an embodiment of a command sequence sent from a master state machine to a slave state machine.

FIG. 14 is a timing diagram of an embodiment of a diagnostic command signal sent from a master diagnostic state machine to a slave diagnostic state machine during a FEXT data collection session. The diagnostic command signal includes a leading serial Sequence 1400 followed by a two bit sequence indicating which one of the four possible channels 1402 of the communication link was selected by the master diagnostic state machine to be used for transmission of a diagnostic test signal 1430. The command pulse width 1432 is asserted for two to three time cycles by the master diagnostic state machine on the selected channel. Two consecutive pulses may be approximately fifty-six nano seconds apart. An absence of a command pulse may indicate a logic-low value, and a presence of a command pulse may indicate a logic-high value.

Figure 15:
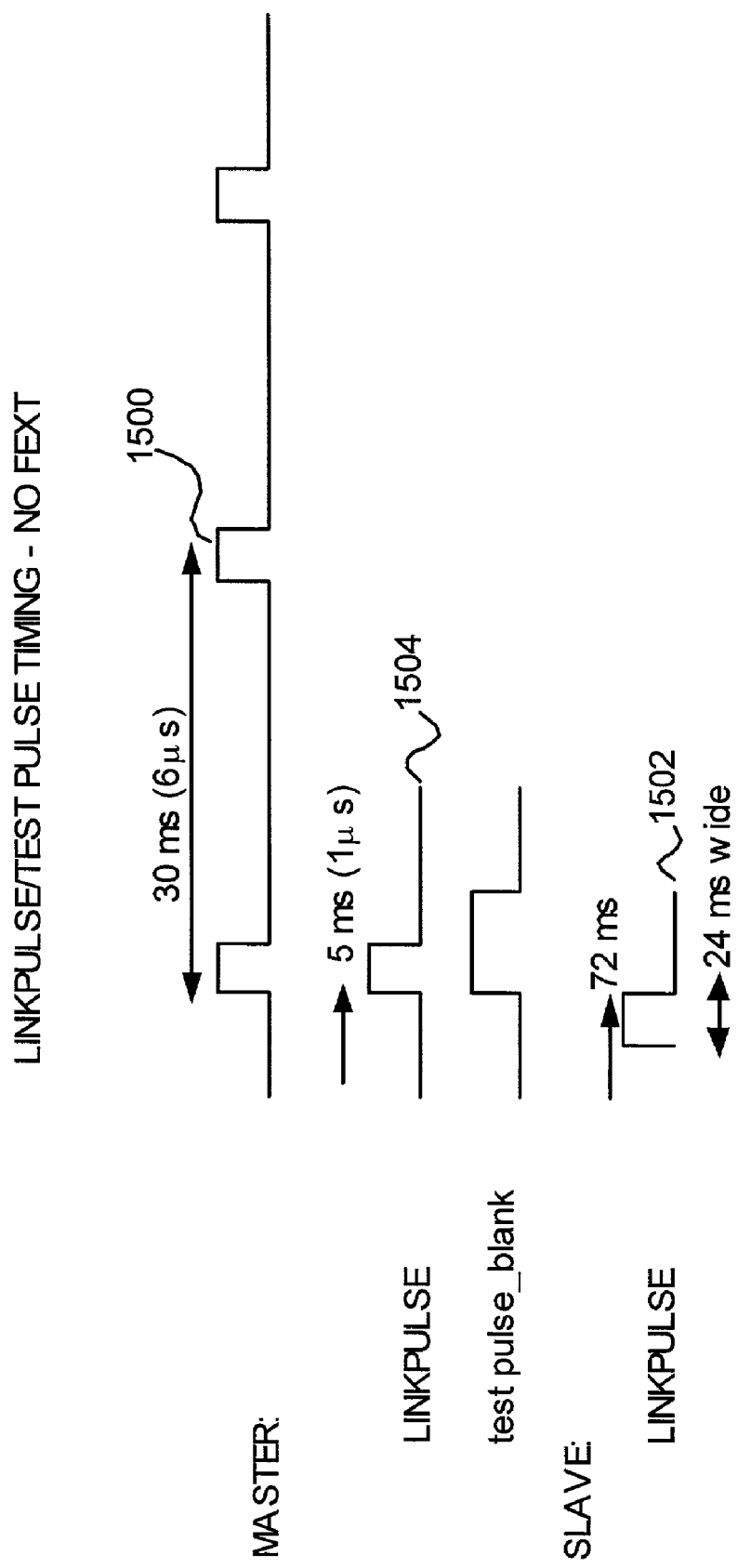
FIG. 15 is a timing diagram of an embodiment of a diagnostic pulse and test signal.

FIG. 15 is a timing diagram of an embodiment of a diagnostic pulse and test signal. In one embodiment of a diagnostic state machine, the diagnostic pulse signals and test signals may be square wave signals. In such an embodiment, the master diagnostic state machine may transmit periodic master diagnostic pulse signals 1500 to the slave diagnostic slave state machine on a first channel of the communications link. The slave diagnostic state machine transmits periodic slave diagnostic pulse signals 1502 to the master diagnostic state machine on a second channel of the communications link. The master and slave diagnostic pulse signals may be characterized by different duty cycles and periods. Diagnostic test signals 1504 may be periodic or may be single pulses transmitted through a channel of the communications link. Diagnostic test signal may be transmitted far away from the diagnostic pulse signals so as to prevent corruption in the data captured.

Figure 16A:
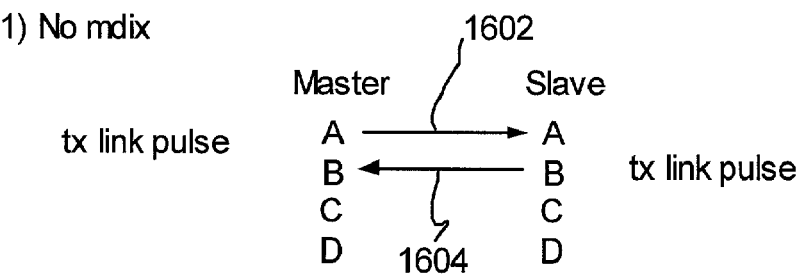
FIGS. 16A–B are a diagrams of exemplary cable cross wiring faults.
Figure 16B:
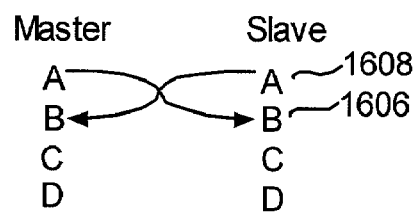

FIG. 16 is a diagram illustrating an exemplary slave diagnostic state machine in accordance with the present invention compensating for cable cross wiring faults. Diagnostic state machines may be implemented on a communications device including four separate transceivers for communication across four twisted pair cables as previously described. A slave diagnostic state machine is able to compensate for cross wiring faults between the four twisted pairs. For example, during a link OK state, the master diagnostic state machine will send out diagnostic pulse signals on a channel A 1602, as shown in FIG. 16A. A slave diagnostic state machine will respond with diagnostic pulse signals on a channel B 1604. If the channels are crossed because a cable is cross wired as shown in FIG. 16B, the slave diagnostic state machine will receive the master diagnostic state machine's diagnostic pulse signals on channel B 1606. The slave diagnostic state machine will then transmit a diagnostic pulse signals in response on channel A 1608. According to this embodiment, the slave diagnostic state machine is capable of adapting itself to accommodate a cross wired cable.

Figure 17:
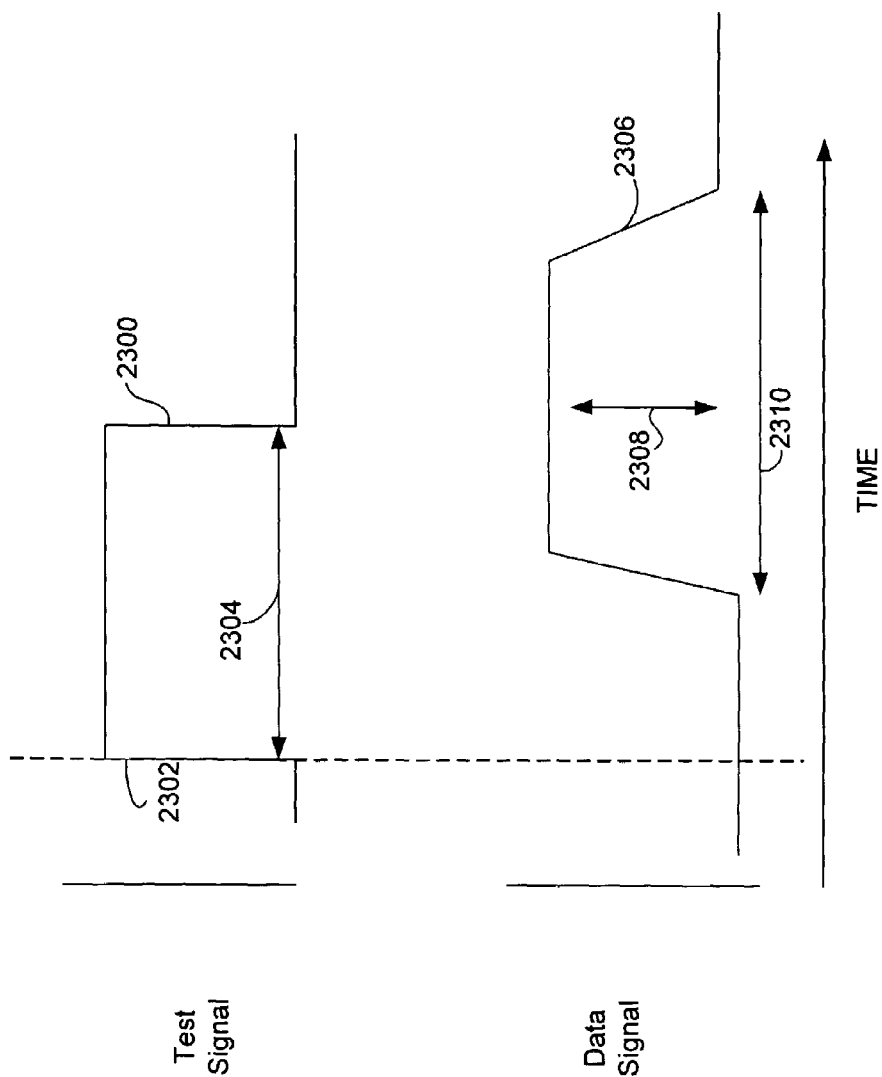
FIG. 17 is a graph of an exemplary transmission and stored reception data signal.

FIG. 17 is a graph of an exemplary diagnostic test signal transmission and stored diagnostic data signal. A diagnostic state machine operates by transmitting a diagnostic test signal 2300 through a communication channel included in a communications link. The diagnostic test signal has a well-characterized magnitude 2302, duration 2304, and envelope. The received diagnostic data signal is the result of either signal reflections caused by impedance mismatches in the twisted pair cable connections or from near and far end crosstalk noise. A resultant received diagnostic data signal 2306 may therefore be distorted and be of an unknown magnitude 2308, duration 2310, and have a poorly characterized envelope. The diagnostic state machine may use an A/D converter 216 and the A/D FIFO 218 as a buffer (both of FIG. 2) to digitize the received diagnostic data signal and store the digitized values in a RAM 724 (FIG. 7). The stored digitized received diagnostic data signal is made available to other software entities for further processing as previously described.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

I claim:

1. A method for generating diagnostic data signals by a first transceiver and a second transceiver operatively coupled via a communications link, the communications link including a plurality of channels, the method comprising:

transmitting by the first transceiver to the second transceiver a first pulse signal via a first channel of the plurality of channels;

transmitting by the second transceiver to the first transceiver a second pulse signal via a second channel of the plurality of channels;

while continuously transmitting by the first transceiver the first pulse signal and by the second transceiver the second pulse signal, performing:

transmitting by the first transceiver a test signal into the communications link via any of the plurality of channels; and receiving by the first transceiver via any of the plurality of channels the communications link a data signal generated within the communications link in response to the test signal.

2. The method of claim 1, wherein the first pulse signals and the second pulse signals are periodic.

3. The method of claim 1, further comprising storing the data signal received by the first transceiver.

4. The method of claim 1, wherein the data signal is an ECHO crosstalk data signal.

5. The method of claim 1, wherein the data signal is a near end crosstalk data signal.

6. A method for generating diagnostic data signals by a first and a second transceiver operatively coupled via a communications link, the communications link including a plurality of channels, the method comprising:
- transmitting by the first transceiver to the second transceiver a pulse signal via a first channel of the plurality of channels;
- transmitting by the second transceiver to the first transceiver an idle signal via a second channel of the plurality of channels;
- while continuously transmitting the pulse signal by the first transceiver and the idle signal by the second transceiver, performing:
  - transmitting by the first transceiver to the second transceiver a command signal via a third channel of the plurality of channels;
  - receiving at the second transceiver from the first transceiver the command signal;
  - transmitting by the second transceiver into the communications link a test signal, the test signal is generated by the second transceiver via any of the plurality of channels using the command signal; and
  - receiving at the first transceiver from the communications link via any of the plurality of channels a data signal generated within the communications link in response to the test signal.

7. The method of claim 6, the method further comprising:
- selecting by the first transceiver a selected channel from the plurality of channels;
- including by the first transceiver a selected channel identification in the command signal;
- decoding the selected channel identification from the command signal performed by the second transceiver;
- decoding test pulse width from the command signal performed by the second transceiver; and
- transmitting by the second transceiver the test signal into the communications link using the selected channel.

8. The method of claim 7, wherein selecting by the first transceiver a selected channel from the plurality of channels includes:
- determining a converged channel for which a first decision feedback equalizer included in the first transceiver and a second decision feedback equalizer included in the second transceiver have converged; and
- using the converged channel as the selected channel.

9. The method of claim 6, wherein the data signal is a far end crosstalk data signal.

10. The method of claim 6, wherein the pulse signal is periodic.

11. The method of claim 6, further comprising storing the data signal.

12. A method for generating diagnostic data signals by a transceiver operatively coupled to a communications link, the communications link including a plurality of channels, the method comprising:
- determining by the transceiver that no other transceivers are coupled to the communications link;
- transmitting by the transceiver into the communications link a test signal via any of the plurality of channels; and
- receiving by the first transceiver from the communications link via any of the plurality of channels a data signal generated within the communications link in response to the test signal.

13. The method of claim 12, further comprising storing the data signal.

14. The method of claim 12, wherein the data signal is an ECHO crosstalk data signal.

15. The method of claim 12, wherein the data signal is a near end crosstalk data signal.

16. A method for generating diagnostic data signals by a first transceiver operatively coupled to a communications link, the communications link including a plurality of channels, the method comprising:
- transmitting by the first transceiver to a second transceiver a first pulse signal via a first channel of the plurality of channels;
- receiving by the first transceiver from the second transceiver a second pulse signal via a second channel of the plurality of channels;
- while continuously transmitting by the first transceiver the first pulse signal and receiving by the first transceiver the second pulse signal, performing:
  - transmitting by the first transceiver a test signal into the communications link via any of the plurality of channels; and
  - receiving by the first transceiver via any of the plurality of channels of the communications link a data signal generated within the communications link in response to the test signal.

17. The method of claim 16, wherein the first and second pulse signals are periodic.

18. The method of claim 16, further comprising storing the data signal.

19. The method of claim 16, wherein the data signal is an ECHO crosstalk data signal.

20. The method of claim 16, wherein the data signal is a near end crosstalk data signal.

21. A method for generating diagnostic data signals by a first transceiver operatively coupled to a communications link, the communications link including a plurality of channels, the method comprising:
- transmitting by the first transceiver to a second transceiver a first pulse signal via a first channel of the plurality of channels;
- receiving by the first transceiver from the second transceiver an idle signal via a second channel of the plurality of channels;
- while continuously transmitting by the first transceiver the pulse signal and receiving by the transceiver the idle signal, performing:
  - transmitting by the first transceiver to the second transceiver a command signal via a third channel of the plurality of channels; and
  - receiving by the first transceiver from the communications link via any of the plurality of channels a data signal generated within the communications link by a test signal transmitted by the second transceiver into the communications link in response to the command signal.

22. The method of claim 21, the method further comprising:
- selecting by the first transceiver a selected channel from the plurality of channels; and decoding test pulse width from the command signal performed by the second transceiver; and including by the first transceiver a selected channel identification in the command signal.

23. The method of 22, wherein selecting by the first transceiver a selected channel from the plurality of channels includes:

determining a converged channel for which a decision feedback equalizer included in the transceiver and a second decision feedback equalizer included in the second transceiver have converged; and using the converged channel as the selected channel.

24. The method of claim 21, wherein the data signal is a far end crosstalk data signal.

25. The method of claim 21, wherein the pulse signal is periodic.

26. The method of claim 21, further comprising storing the data signal.

27. A method for generating diagnostic data signals by a first transceiver assisted by a second transceiver operatively coupled via a communications link, the communications link including a plurality of channels, the method comprising:

transmitting by the first transceiver to the second transceiver a first periodic pulse signal via a first channel of the plurality of channels;

transmitting by the second transceiver to the first transceiver a second periodic pulse signal via a second channel of the plurality of channels;

while continuously transmitting the first and second periodic pulse signals by the first and second transceivers respectively, performing:

transmitting by the first transceiver a test signal via a third channel of the plurality of channels; and receiving by the first transceiver via a fourth channel of the plurality of channels a near end cross talk data signal generated within the communications link in response to the test signal.

28. The method of claim 27, wherein the first and second transceivers are controlled by a first and second state machine respectively, the method further comprising an autonegotiation process whereby the first and second state machines become master and slave diagnostic state machines.

29. A method for generating diagnostic data signals by a first transceiver assisted by a second transceiver operatively coupled via a communications link, the communications link including a plurality of channels, the method comprising:

transmitting by the first transceiver to the second transceiver a first periodic pulse signal via a first channel of the plurality of channels;

transmitting by the second transceiver to the first transceiver a second periodic pulse signal via a second channel of the plurality of channels;

while continuously transmitting the first and second periodic pulse signals by the first and second transceivers respectively, performing the following steps:

transmitting by the first transceiver a test signal via a third channel of the plurality of channels; and receiving by the first transceiver via any of the plurality of channels of the communications link a data signal generated within the communications link in response to the test signal.

30. The method of claim 29, wherein the first and second transceivers are controlled by a first and second state machine respectively, the method further comprising an autonegotiation process whereby the first and second state machines become master and slave diagnostic state machines.

31. A method for generating diagnostic data signals by a first transceiver assisted by a second transceiver operatively coupled via a communications link, the communications link including a plurality of channels, the method comprising:

transmitting by the second transceiver to the first transceiver an idle signal via a first channel of the plurality of channels;

transmitting by the first transceiver to the second transceiver a periodic pulse signal via a second channel of the plurality of channels;

while continuously transmitting the pulse signal and idle signal by the first and second transceivers respectively, performing the following steps:

selecting by the first transceiver a selected channel from the plurality of channels;

generating by the first transceiver a command signal using an identification of the selected channel;

transmitting by the first transceiver to the second transceiver the command signal via a third channel of the plurality of channels;

receiving by the second transceiver from the first transceiver the command signal;

determining by the second transceiver the selected channel using the command signal;

transmitting by the second transceiver into the communications link via the selected channel a test signal; and receiving by the first transceiver from a channel of the plurality of channels a far end cross talk data signal generated within the communications link in response to the test signal.

32. The method of claim 31, wherein the first and second transceivers are controlled by a first and second state machine respectively, the method further comprising an autonegotiation process whereby the first and second state machines become master and slave diagnostic state machines.

33. A diagnostic data signal generator apparatus for a communications system having a first transceiver and a second transceiver coupled therebetween by a communications link having a plurality of channels comprising:

a first transceiver controller controlling transmission of a first pulse signal transmitted by the first transceiver to the second transceiver over a first channel of the plurality of channels;

a second transceiver controller controlling transmission of a second pulse signal transmitted by the second transceiver over a second channel of the plurality of channels;

the first transceiver controller controlling transmission by the first transceiver onto the communications link via any of the plurality of channels of a test signal;

the first transceiver receiving a data signal via any of the plurality of channels generated within the communications link in response to the test signal; and the first pulse signal and the second pulse signal being periodic and continuously transmitted while the first transceiver transmits the test signal and receives the data signal.

34. The diagnostic data signal generator apparatus of claim 33, wherein the first transceiver controller includes a master diagnostic state machine controlling the first transceiver and the second transceiver controller includes a slave diagnostic state machine controlling the second transceiver.

35. The diagnostic data signal generator apparatus of claim 33, further comprising a data storage coupled to the first transceiver controller for storing the data signal received by the first transceiver controller.

36. The diagnostic data signal generator apparatus of claim 33, wherein the data signal is an ECHO crosstalk data signal.

37. The diagnostic data signal generator apparatus of claim 33, wherein the data signal is a near end crosstalk data signal.

38. A diagnostic data signal generator apparatus for a communications system having a first transceiver and a second transceiver coupled therebetween by a communications link having a plurality of channels comprising:
 a master diagnostic state machine controlling transmission of a first pulse signal by the first transceiver, the master diagnostic state machine being coupled through the first transceiver to the second transceiver via a first channel of the plurality of channels; and
 a slave diagnostic state machine controlling transmission of a second pulse signal by the second transceiver, the slave diagnostic state machine being coupled through the second transceiver to the first transceiver via a second channel of the plurality of channels;
 the first transceiver transmitting into the communications link via any of the plurality of channels a test signal;
 the first transceiver receiving a data signal generated within any of the plurality of channels of the communications link in response to the test signal; and
 the first pulse signal and the second pulse signal being periodic and continuously transmitted while the master diagnostic state machine controls transmission of the test signal and reception of the data signal.

39. The diagnostic data signal generator apparatus of claim 38, further comprising a data storage coupled to the master diagnostic state machine for storing the data signal received by the master diagnostic state machine.

40. The diagnostic data signal generator apparatus of claim 38, wherein the data signal is an ECHO crosstalk data signal.

41. The diagnostic data signal generator apparatus of claim 38, wherein the data signal is a near end crosstalk data signal.

42. A diagnostic data signal generator apparatus for a communications system having a first transceiver and a second transceiver coupled therebetween by a communications link having a plurality of channels comprising:
 a first transceiver controller controlling transmission of a pulse signal by the first transceiver to the second transceiver over a first channel of the plurality of channels; and
 a second transceiver controller controlling transmission of an idle signal by the second transceiver over a second channel of the plurality of channels;
 the first transceiver controller controlling transmission by the first transceiver to the second transceiver a command signal via a third channel of the plurality of channels;
 the second transceiver controller controlling reception by the second transceiver from the first transceiver the command signal;
 the second transceiver controller controlling transmission by the second transceiver into the communications link of a test signal, the test signal generated by the second transceiver via any of the plurality of channels using the command signal; and
 the first transceiver controller controlling reception by the first transceiver from the communications link of a data signal generated within the communications link via any of the plurality of channels in response to the test signal; and
 the pulse signal and the idle signal being continuously transmitted while the first transceiver controller controls transmission of the command signal and reception of the data signal and the second transceiver controller controls reception of the command signal and transmission of the test signal.

43. The diagnostic data signal generator apparatus of claim 42, wherein the first transceiver controller includes a master diagnostic state machine controlling the first transceiver and the second transceiver controller includes a slave diagnostic state machine controlling the second transceiver.

44. The diagnostic data signal generator apparatus of claim 42, further comprising a data storage coupled to the first transceiver controller for storing the data signal by the first transceiver controller.

45. The diagnostic data signal generator apparatus of claim 42, wherein the data signal is a far end crosstalk data signal.

46. A diagnostic data signal generator apparatus for a communications system having a first transceiver and a second transceiver coupled therebetween by a communications link having a plurality of channels comprising:
 a master diagnostic state machine controlling transmission of a periodic pulse signal, the master diagnostic state machine being coupled through the first transceiver to the second transceiver via a first channel of the plurality of channels;
 a slave diagnostic state machine controlling transmission of a periodic idle signal by the second transceiver, the slave diagnostic state machine being coupled through the second transceiver to the first transceiver via a second channel of the plurality of channels;
 the master diagnostic state machine controlling transmission by the first transceiver to the second transceiver a command signal via a third channel of the plurality of channels;
 the slave diagnostic state machine controlling reception by the second transceiver from the first transceiver the command signal;
 the slave diagnostic state machine controlling transmission by the second transceiver into the communications link of a test signal, the test signal generated by the second transceiver via any of the plurality of channels using the command signal;
 the master state machine controlling reception by the first transceiver from the communications link via any of the plurality of channels of a far cross talk data signal generated within the communications link in response to the test signal; and
 the pulse signal and the idle signal being continuously transmitted while the master diagnostic state machine controls transmission of the command signal and reception of the far end crosstalk data signal and the slave diagnostic state machine controls reception of the command signal and transmission of the test signal.

47. The diagnostic data signal generator apparatus of claim 46, further comprising a data storage coupled to the master diagnostic state machine for storing the data signal received by the master diagnostic state machine.

* * * * *